US008265915B2

(12) United States Patent
Hsu et al.

(10) Patent No.: US 8,265,915 B2
(45) Date of Patent: Sep. 11, 2012

(54) METHOD FOR PREDICTING WELL RELIABILITY BY COMPUTER SIMULATION

(75) Inventors: Sheng-Yuan Hsu, Sugar Land, TX (US); Kevin H. Searles, Kingwood, TX (US); Jon M. Wallace, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 271 days.

(21) Appl. No.: 12/602,622

(22) PCT Filed: Jun. 13, 2008

(86) PCT No.: PCT/US2008/007438
§ 371 (c)(1),
(2), (4) Date: Dec. 1, 2009

(87) PCT Pub. No.: WO2009/029135
PCT Pub. Date: Mar. 5, 2009

(65) Prior Publication Data
US 2010/0204972 A1     Aug. 12, 2010

Related U.S. Application Data

(60) Provisional application No. 60/966,072, filed on Aug. 24, 2007.

(51) Int. Cl.
*G06F 17/50* (2006.01)
(52) U.S. Cl. ......................................................... 703/10
(58) Field of Classification Search ...................... 703/10
See application file for complete search history.

(56) References Cited

U.S. PATENT DOCUMENTS

| 4,821,242 A | 4/1989 | Hennington |
| 5,058,012 A | 10/1991 | Hinchman et al. |
| 5,321,612 A | 6/1994 | Stewart |

(Continued)

FOREIGN PATENT DOCUMENTS

WO     WO 2007/116008 A1     10/2007

(Continued)

OTHER PUBLICATIONS

Yarlong Wang, Baoping Lu, "A Coupled Reservoir-Geomechanics Model and Applications to Wellbore Stability and Sand Prediction" Society of Petrolium Engineers Inc., 2001, pp. 1-14.*

(Continued)

*Primary Examiner* — Dwin M Craig
(74) *Attorney, Agent, or Firm* — ExxonMobil Upstream Research Company - Law Department

(57) ABSTRACT

Methods of predicting earth stresses in response to pore pressure changes in a hydrocarbon-bearing reservoir within a geomechanical system, include establishing physical boundaries for the geomechanical system and acquiring reservoir characteristics. Geomechanical simulations simulate the effects of changes in reservoir characteristics on stress in rock formations within the physical boundaries to determine the rock formation strength at selected nodes in the reservoir. The strength of the rock formations at the nodes is represented by an effective strain ($\epsilon_{eff}$), which includes a compaction strain ($\epsilon_c$) and out-of-plane shear strains (Y1-3, Y2-3) at a nodal point. The methods further include determining an effective strain criteria ($\epsilon_{eff}^{cr}$) from a history of well failures in the physical boundaries. The effective strain ($\epsilon_{eff}^{cr}$) at a selected nodal point is compared with the effective strain criteria ($\epsilon_{eff}^{cr}$) to determine if the effective strain ($\epsilon_{eff}$) exceeds the effective strain criteria ($\epsilon_{eff}^{cr}$).

48 Claims, 9 Drawing Sheets

U.S. PATENT DOCUMENTS

| | | |
|---|---|---|
| 5,416,697 A | 5/1995 | Goodman |
| 5,740,342 A | 4/1998 | Kocberber |
| 5,848,379 A | 12/1998 | Bishop |
| 5,892,732 A | 4/1999 | Gersztenkorn |
| 5,930,730 A | 7/1999 | Marfurt et al. |
| 5,986,974 A | 11/1999 | Luo et al. |
| 6,078,869 A | 6/2000 | Gunasekera |
| 6,106,561 A | 8/2000 | Farmer |
| 6,131,071 A | 10/2000 | Partyka et al. |
| 6,196,318 B1 | 3/2001 | Gong et al. |
| 6,256,603 B1 | 7/2001 | Celniker |
| 6,266,619 B1 | 7/2001 | Thomas et al. |
| 6,460,006 B1 | 10/2002 | Corcoran |
| 6,549,854 B1 | 4/2003 | Malinverno et al. |
| 6,597,995 B1 | 7/2003 | Cornu et al. |
| 6,640,190 B2 | 10/2003 | Nickel |
| 6,654,692 B1 | 11/2003 | Neff |
| 6,668,922 B2 | 12/2003 | Ziauddin et al. |
| 6,745,159 B1 | 6/2004 | Todd et al. |
| 6,751,558 B2 | 6/2004 | Huffman et al. |
| 6,754,587 B1 | 6/2004 | Trappe et al. |
| 6,766,255 B2 | 7/2004 | Stone |
| 6,785,641 B1 | 8/2004 | Huang |
| 6,804,609 B1 | 10/2004 | Brumbaugh |
| 6,810,332 B2 | 10/2004 | Harrison |
| 6,813,564 B2 | 11/2004 | Eiken et al. |
| 6,836,731 B1 | 12/2004 | Whalley et al. |
| 6,840,317 B2 | 1/2005 | Hirsch et al. |
| 6,842,700 B2 | 1/2005 | Poe |
| 6,892,812 B2 | 5/2005 | Niedermayr et al. |
| 6,901,391 B2 | 5/2005 | Storm, Jr. et al. |
| 6,941,255 B2 | 9/2005 | Kennon et al. |
| 6,947,843 B2 | 9/2005 | Fisher et al. |
| 6,978,210 B1 | 12/2005 | Suter et al. |
| 6,980,929 B2 | 12/2005 | Aronstam et al. |
| 6,980,940 B1 | 12/2005 | Gurpinar et al. |
| 7,043,410 B2 | 5/2006 | Malthe-Sorenssen et al. |
| 7,054,752 B2 | 5/2006 | Zabalza-Mezghani et al. |
| 7,062,420 B2 | 6/2006 | Poe, Jr. |
| 7,066,019 B1 | 6/2006 | Papanastasiou |
| 7,089,166 B2 | 8/2006 | Malthe-Sorenssen et al. |
| 7,089,167 B2 | 8/2006 | Poe |
| 7,099,811 B2 | 8/2006 | Ding et al. |
| 7,113,869 B2 | 9/2006 | Xue |
| 7,177,764 B2 | 2/2007 | Stone |
| 7,181,380 B2 | 2/2007 | Dusterhoft et al. |
| 7,188,058 B2 | 3/2007 | Hardy et al. |
| 7,191,062 B2 | 3/2007 | Chi et al. |
| 7,200,539 B2 | 4/2007 | Ong et al. |
| 7,369,979 B1 | 5/2008 | Spivey |
| 7,561,998 B2 | 7/2009 | Panga et al. |
| 7,603,261 B2 | 10/2009 | Tardy |
| 7,657,415 B2 | 2/2010 | Panga et al. |
| 2002/0013687 A1 | 1/2002 | Ortoleva |
| 2002/0029137 A1 | 3/2002 | Malthe-Sorenssen et al. |
| 2002/0049575 A1 | 4/2002 | Jalali et al. |
| 2002/0055868 A1 | 5/2002 | Dusevic et al. |
| 2002/0120429 A1 | 8/2002 | Ortoleva |
| 2002/0169559 A1 | 11/2002 | Onyia et al. |
| 2004/0010373 A1 | 1/2004 | Smits et al. |
| 2004/0122640 A1 | 6/2004 | Dusterhoft |
| 2004/0199329 A1 | 10/2004 | Stone |
| 2005/0015204 A1 | 1/2005 | Xue |
| 2005/0015231 A1 | 1/2005 | Edwards et al. |
| 2005/0043890 A1 | 2/2005 | Sanstrom |
| 2005/0065730 A1 | 3/2005 | Sinha |
| 2005/0121197 A1 | 6/2005 | Lopez de Cardenas et al. |
| 2005/0125203 A1 | 6/2005 | Hartman |
| 2005/0149307 A1 | 7/2005 | Gurpinar et al. |
| 2005/0197813 A1 | 9/2005 | Grayson |
| 2005/0199391 A1 | 9/2005 | Cudmore et al. |
| 2005/0209836 A1 | 9/2005 | Klumpen et al. |
| 2005/0267719 A1 | 12/2005 | Foucault |
| 2005/0273302 A1 | 12/2005 | Huang et al. |
| 2005/0273304 A1 | 12/2005 | Oliver et al. |
| 2006/0015310 A1 | 1/2006 | Husen et al. |
| 2006/0047431 A1 | 3/2006 | Geiser |
| 2006/0047489 A1 | 3/2006 | Scheidt et al. |
| 2006/0085174 A1 | 4/2006 | Hemanthkumar et al. |
| 2006/0100837 A1 | 5/2006 | Symington et al. |
| 2006/0104158 A1* | 5/2006 | Walls et al. ............... 367/73 |
| 2006/0129366 A1* | 6/2006 | Shaw ............... 703/10 |
| 2006/0149518 A1 | 7/2006 | Oliver et al. |
| 2006/0153005 A1 | 7/2006 | Herwanger et al. |
| 2006/0224370 A1 | 10/2006 | Siebrits et al. |
| 2007/0083330 A1 | 4/2007 | Frenkel |
| 2007/0156377 A1 | 7/2007 | Gurpinar et al. |
| 2007/0244681 A1 | 10/2007 | Cohen et al. |
| 2007/0271077 A1 | 11/2007 | Kosmala et al. |
| 2007/0294034 A1 | 12/2007 | Bratton et al. |
| 2008/0015831 A1 | 1/2008 | Tardy et al. |
| 2008/0015832 A1 | 1/2008 | Tardy |
| 2008/0033656 A1 | 2/2008 | Herwanger |
| 2008/0319674 A1 | 12/2008 | Dai et al. |
| 2009/0055098 A1 | 2/2009 | Mese et al. |
| 2009/0294122 A1 | 12/2009 | Hansen et al. |

FOREIGN PATENT DOCUMENTS

| | | |
|---|---|---|
| WO | WO 2008/131351 A1 | 10/2008 |

OTHER PUBLICATIONS

M.R. (Mike) Carlson, "Practical Reservoir Simulation" PennWell Corporation, 2006, pp. 494 and 496.*

J. Hassing, T. Parsons, Huang X. H., J. Baranowski, K. Pande, "Integrated Approach to Geological and Reservoir Simulation Modeling Yields New Insights" Society of Petroleum Engineers, 2000, pp. 1-7.*

Baeten, G.J.M., et al., Directional Deconvultion in the F-X Domain, Abstract 1991:5004, Sep. 23-27, 1990, $60^{th}$ Annual Seg. Int'l. Meeting.

Da Silva, F.V., et al., "Casing Collapse Analysis Associated with Reservoir Compaction and Overburden Subsidence", SPE 20953, Oct. 23-24, 1990, pp. 127-133, Europec 90, The Hague, Netherlands.

Fredrich, J.T., et al., "Three-Dimensional Geomechanical Simulation of Reservoir Compaction and Implications for Well Failures in the Belridge Diatomite", SPE 36698, Oct. 6-9, 1996, pp. 195-210, 1996 SPE Annual Technical Conf. and Exh., Denver, CO.

Häusler, H., et al., "A New Exploration Approach in a Mature Basin: Integration of 3-D Seismic, Remote-Sensing, and Microtectonic Data, Southern Vienna Basin, Austria", 2002, pp. 433-451, AAPG Studies in Geology No. 48 and SEG Geophysical References Series No. 11.

Lee, T-Y., et al., "History Matching by Spline Approximation and Regularization in Single-Phase Areal Reservoirs", Sep. 1986, pp. 521-534, SPE Reservoir Engineering.

Olden, P., et al., "Modeling Combined Fluid and Stress Change Effects in the Seismic Response of a Producing Hydrocarbon Reservoir", Oct. 2001, pp. 1154-1157, The Leading Edge.

Pöppelreiter, M., et al., "Structural Control on Sweet-Spot Distribution in a Carbonate Reservoir: Concepts and 3-D Models (Cogollo Group, Lower Cretaceous, Venezuela)", Dec. 2005, pp. 1651-1676, vol. 89, No. 12, AAPG Bulletin.

Roumboutsos, A., "The Application of Deconvolution in Well Test Analysis", Abstract 1989:20444, Dissertation, Jul. 1989, Jeropt Watt Imoversotu.

Schutjens, P., "On the Stress Change in Overburden Resulting from Reservoir Compaction: Observations from Two Computer Models and Implications for 4D Seismic", May 2007, pp. 628-634, The Leading Edge.

International Search Report, dated Sep. 10, 2008, PCT/US2008/07438.

* cited by examiner

METHOD FOR PREDICTING WELL RELIABILITY BY COMPUTER SIMULATION

CROSS REFERENCE TO RELATED APPLICATIONS

This application is the National Stage entry under 35 U.S.C. 371 of PCT/US2008/007438 that published as WO 2009/029135 and was filed on 13 Jun. 2008, which claims the benefit of U.S. Provisional Application No. 60/966,072, filed 24 Aug. 2007, each of which is incorporated herein by reference, in its entirety, for all purposes.

BACKGROUND OF THE INVENTION

1. Field of the Invention

The present invention relates to the field of geomechanical modeling. More specifically, the present invention relates to the analysis of earth stresses associated with hydrocarbon recovery processes.

2. Background of the Invention

A subterranean hydrocarbon-bearing reservoir is confined by a state of in-situ tectonic stress. When producing hydrocarbons from the reservoir, the stress state of the reservoir may change. When the state of stress within and above the hydrocarbon-bearing reservoir exceeds the mechanical limits of wells completed in the production area, the completion assemblies forming the wells may be damaged.

A concern may also exist with respect to the effect that fluid removal from the reservoir may have at the earth surface. In this respect, in situ hydrocarbons provide pore pressure which acts against the overburden and which supports the rock strata above the formation. The removal of hydrocarbons, particularly when the rock matrix in the subsurface reservoir is weak, causes a reduction in pore pressure. When this occurs, the weight of the overburden is increasingly supported by the rock matrix, causing a compaction of the subsurface formation in response to the increased stress. This, in turn, can cause a subsidence of the earth at the surface.

The inverse can also occur in connection with fluid injection. Injection operations may be conducted as part of enhanced oil recovery, such as the injection of steam or brine into a producing formation. Injection operations may also occur simply in connection with a water disposal program. The injection of fluids into the subsurface formation will cause an increase in pore pressure within the targeted formation. This, in turn, can create stresses in the formation that may affect wellbore casings. Further, increased pore pressure may cause heave at the surface of the earth.

It may be desirable for the operator to predict the likelihood or extent of earth movement as a result of subsidence or heave. In some instances, earth movement is sought to be controlled in order to avoid environmental or hydrogeological impact. In this respect, changing the contour and relief of the earth surface can change runoff patterns, affect vegetation patterns, and impact watersheds.

It may also be desirable to predict local changes in the in-situ state of stress and the impact of such changes on well integrity over the life of reservoir production. Compaction particularly has the potential of damaging producers or injectors formed in a production area. In this respect, downward earth movement can create damaging hoop and compressional stresses on wellbore casings, cement jobs, and downhole equipment. When substantial deformation occurs, a well may lose its capability to permit remediation and may even block fluid passage. At this stage, the casing needs to be repaired or the well plugged and abandoned, and a new well created.

To anticipate changes in geomechanical stress, it has been proposed to use an integrated geomechanical and reservoir analysis. Newer and more sophisticated measurement techniques have demonstrated that variations in reservoir deliverability are related to interactions between changing fluid pressures, rock stresses and flow parameters. For instance, Young's modulus and Poisson's ratio are related to porosity.

It is desirable to model changes in geomechanical stress through finite element analysis. Finite element analysis involves the representation of individual, finite elements of a geological system in a mathematical model, and the solution of the model in the presence of a predetermined set of boundary conditions. Changes to the system are predicted as fluid pressures change.

In finite element modeling, the region that is to be analyzed is broken up into sub-regions called elements. The process of dividing a production area under study into sub-regions may be referred to as "discretization" or "mesh generation." A mesh is a collection of elements that fill a space, with the elements being representative of a system which resides in that space. In finite element modeling, the region that is to be analyzed is represented by functions defined over each element. This generates a number of local functions that are less complicated than those which would be required to represent the entire region.

Finite element models have been used for analyzing production-induced earth stress changes associated with hydrocarbon recovery processes. For example, U.S. Pat. No. 6,766,255 describes a method of determining subsidence in a producing reservoir. However, it is desirable to have an improved geomechanical modeling method that automatically builds a three-dimensional map-based model from subsurface data, and then converts the map-based model into a finite-element-based model. A need also exists for a geomechanical model that corrects nonconformities in the earth layers, thereby accounting for pinchouts and erosive zones. A need further exists for an improved method for modeling a reservoir that takes into account changes in geomechanical stress over a period in the life of a reservoir. In addition, a need exists for a systematic method for assessing injector or producer well reliability by computer simulation.

SUMMARY OF THE INVENTION

A computer-implemented method for predicting well reliability in a three-dimensional geomechanical system is provided. Preferably, the geomechanical system is a hydrocarbon reservoir.

The method comprises defining physical boundaries for the geomechanical system. In addition, at least one reservoir characteristic is acquired from multiple wells within the physical boundaries. In one aspect, the at least one reservoir characteristic is pore pressure history. However, it may alternatively be porosity, permeability, temperature history, or combinations thereof.

The method also includes running a geomechanical simulation for the geomechanical system to simulate the effects of changes in the at least one reservoir characteristic on stress in rock formations within the physical boundaries. From the simulation, the strength of the rock formations at selected nodes in the reservoir may be determined. Preferably, the strength of the formation is represented by an effective strain ($\epsilon_{eff}$) that takes into account a compaction strain ($\epsilon_c$) and out-of-plane shear strains ($\gamma_{1-3}, \gamma_{2-3}$).

The method also includes determining an effective strain criteria ($\epsilon_{\mathit{eff}}^{cr}$). Preferably, the effective strain criteria ($\epsilon_{\mathit{eff}}^{cr}$) based at least in part upon a history of well failures experienced in the physical boundaries. A comparison is then made. The comparison step is performed by comparing (1) the effective strain ($\epsilon_{\mathit{eff}}$) at a selected nodal point representing the approximate location of a well at a given depth within the physical boundaries, with (2) the effective stain criteria ($\epsilon_{\mathit{eff}}^{cr}$). The purpose is to determine if the effective strain ($\epsilon_{\mathit{eff}}$) exceeds the effective strain criteria ($\epsilon_{\mathit{eff}}^{cr}$).

In one embodiment, the method includes additional steps prior to running the geomechanical simulation. These include acquiring mechanical properties of rock formations within the physical boundaries, and automatically creating a finite element mesh representing the geomechanical system. Here, the mesh defines a plurality of nodes representing points in space, with each point having potential displacement in more than one direction. The mesh preferably provides a positive value for any rock formations having a zero thickness as derived from subsurface data. In this way, a positive volume is created for each rock formation.

The method may also include mapping pore pressure within the geomechanical system at a first time for nodes within the mesh, and mapping pore pressure within the geomechanical system at a plurality of additional times to correspond to the nodes within the mesh. In this manner a pore pressure history is mapped and interpolations may be conducted.

In one aspect, a finite-element-based model provides submodels having increasing levels of refinement. This allows the analyst to determine compaction strain ($\epsilon_c$) and out-of-plane shear strains ($\gamma_{1-3}$, $\gamma_{2-3}$) at selected nodes in the reservoir. The selected nodes may approximate the location of selected wells.

The out-of-plane shear strains ($\gamma_{1-3}$, $\gamma_{2-3}$) may be combined into an effective shear strain ($\gamma_{\mathit{eff}}$) using a cubic spline or other calculation. In one aspect, the effective shear strain ($\gamma_{\mathit{eff}}$) is an effective shear strain increment ($\Delta\gamma_{\mathit{eff}}$) calculated by computing a differential between the effective shear strain at a nodal point proximate to a selected well at the time the selected well was completed, and the effective shear strain at that nodal point at a specified later point in time. Similarly, the compaction strain ($\epsilon_c$) may be a compaction strain increment ($\Delta\epsilon_c$) calculated by computing a differential between the compaction strain at the nodal point proximate to the selected well at the time the selected well was completed, and the compaction strain at that nodal point at the specified later point in time. Also, the effective strain is preferably an effective strain increment ($\Delta\epsilon_{\mathit{eff}}$) calculated using an interpolative method.

The method may also include making a decision: if the effective strain ($\epsilon_{\mathit{eff}}$) at the selected nodal point meets or exceeds the effective strain criteria ($\epsilon_{\mathit{eff}}^{cr}$), a decision is made to retool the well, plug the well, or plug the well and install a new well; if the effective strain ($\epsilon_{\mathit{eff}}$) at the selected nodal point does not exceed the effective strain criteria ($\epsilon_{\mathit{eff}}^{cr}$), then the strength of the formation at the selected nodal point may be rechecked at a later time.

In one embodiment, prior to running a geomechanical simulation, the method further comprises acquiring subsurface data for the rock formations. The subsurface data represents well logging data, seismic data, or combinations thereof. The physical boundaries for the geomechanical system and the subsurface data for the rock formations within the physical boundaries may be entered into a pre-processor program. The purpose is to create a three-dimensional grid in a map-based computer model. The three-dimensional grid is automatically compiled from the subsurface data. The three-dimensional grid defines nodes in a geological structure that are converted into the nodes of the finite element mesh as a result of creating the finite element mesh. Preferably, running a geomechanical simulation for the geomechanical system is performed by running the geomechanical solver program to solve for earth stress changes.

Also disclosed herein are methods for predicting wellbore failure in a geomechanical system. The geomechanical system has a subsurface rock formation containing a hydrocarbon reservoir. In one embodiment, a method includes selecting a strain criteria at which wellbores in the geomechanical system are predicted to fail. The strain criteria is based at least in part upon a history of wellbore failures already experienced in the hydrocarbon reservoir. The method also includes running a geomechanical simulation to simulate the effects of changes in a selected reservoir characteristic on stress in rock formations within the hydrocarbon reservoir. The simulation models a selected time and a selected wellbore area to generate a simulated wellbore strain.

The method then includes a comparison step. The simulated wellbore strain is compared with the strain criteria to determine if the simulated wellbore strain exceeds the strain criteria. This way, failure of a selected wellbore may be predicted. This method may be carried out for multiple wellbores in a field.

In one aspect, the method also includes adjusting hydrocarbon reservoir management processes to militate against the predicted wellbore failure or failures. For example, adjusting hydrocarbon reservoir management processes may comprise adding one or more injectors to an area of the geomechanical system where wellbore failures are predicted to occur. Alternatively, or in addition, adjusting hydrocarbon reservoir management processes may comprise spacing apart the location of future producers in the area of the geomechanical system where wellbore failures are predicted to occur.

BRIEF DESCRIPTION OF THE DRAWINGS

So that the manner in which the features of the present invention can be better understood, certain drawings and charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
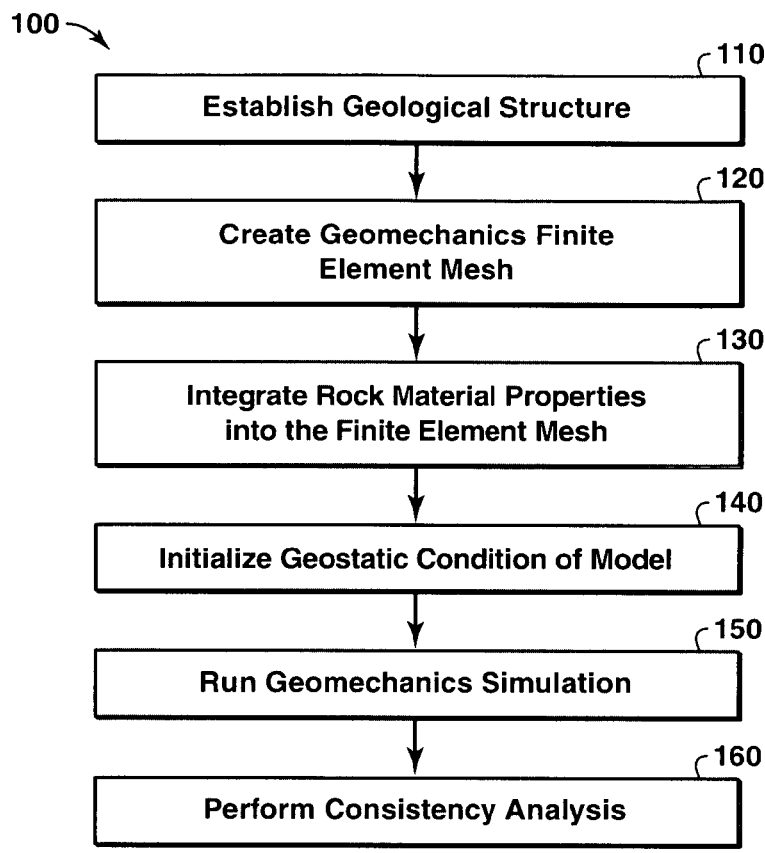
FIG. 1 is a flow diagram illustrating a geomechanical modeling method according to one embodiment of the invention.

As used herein, the term "burial" refers to a geologic process, whether continuous or discontinuous, and whether related to sedimentary deposition, volcanic eruption and/or other geologic process wherein multiple strata are placed in a substantially successive manner, one stratum atop another, in a corresponding series of stratum-producing phases leading to a formation's creation. As used herein, where the term "burial" is associated with a rock property value (e.g., Poisson's Ratio or Young's Modulus) for a stratum of interest, the term designates a virtual value of the rock property for each stratum considered pertinent to developing a stratigraphic model suitable for performing the desired stress analysis of the formation. Depending on the formation, the oldest stratum and the successively newer strata of interest can be produced in any one of the primary geologic eras.

"Lithology" means a description of the physical and approximate compositional character of a rock based on a variety of rock attributes, including without limitation, color, structures, grain size and mineralogic components. One or more of these attributes may be determined by visual evaluation (by eye alone or assisted by a magnifier), seismic interpretation and/or well log interpretation.

"Strain" means a measure of the extent to which a body of material is deformed and/or distorted when it is subjected to a stress-inducing force. "Stress-Inducing Force" refers to an action of at least one force, load and/or constraint on a body of material that tends to strain the body. Examples of the body's deformation or distortion can include, without limitation, changes in the body's length (e.g., linear strain), volume (e.g., bulk strain) and/or a lateral displacement between two substantially parallel planes of material within the body (e.g., shear strain).

"Stress" is a measure of inter-particle forces arising within a body of material resisting deformation and/or distortion, in response to a stress-inducing force applied to the body, as particles within the body of material work to resist separation, compression and/or sliding.

"Principal Stress" means any one of three inherent normal stresses, each perpendicular to the other, in a predetermined coordinate system where the three corresponding shear stresses are equal to zero. Generally, though not always, one of the principal stresses is substantially vertical in a formation, while the two remaining principal stresses are substantially horizontal. While there is no requirement for the principal stresses to be vertical or horizontal, for ease of discussion herein, the three principal stresses, are referred to as principal vertical stress, $\sigma_{vert}$, greater principal horizontal stress, $\sigma_{horiz-1}$, and lesser principal horizontal stress, $\sigma_{horiz-2}$.

"Poisson Ratio," or "ν," means, for a substantially elastic body of material when placed under a substantially uniaxial stress, the ratio of the strain normal to the uniaxial stress to the strain parallel to the uniaxial stress.

"Elastic stress to-strain modulus" means a ratio of stress applied to a body versus the strain produced. Elastic stress-to-strain moduli include, without limitation, Young's modulus, ("E"), bulk modulus ("K"), and shear modulus ("G").

"Young's Modulus" ("E") means, for a substantially elastic body of material when placed under a substantially uniaxial stress less than the material's yield strength, whether a tension or compression stress, the ratio of the uniaxial stress, acting to change the body's length (parallel to the stress), to the fractional change in the body's length.

"Elastic" means a body of material capable of sustaining deformation and/or distortion without permanent loss of size or shape in response to a stress-inducing force, whether the body's response is linear elastic or non-linear elastic.

"Inelastic" or "Plastic" means that any deformation and/or distortion to a body of material subjected to a stress-inducing force is permanent, i.e. deformation/distortion remains after the force is removed.

"Yield Strength" means the stress value at which deformation resulting from a stress-inducing force becomes permanent. At that stress value, a body of material, which previously exhibited an elastic response, will begin to exhibit a plastic response to the stress-inducing force.

"Subsurface" means beneath the top surface of any mass of land at any elevation or over a range of elevations, whether above, below or at sea level, and/or beneath the floor surface of any mass of water, whether above, below or at sea level.

"Formation" means a subsurface region, regardless of size, comprising an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation may contain numerous geologic strata of different ages, textures and mineralogic compositions. A formation can refer to a single set of related geologic strata of a specific rock type, or to a whole set of geologic strata of different rock types that contribute to or are encountered in, for example, without limitation, (i) the creation, generation and/or entrapment of hydrocarbons or minerals and (ii) the execution of processes used to extract hydrocarbons or minerals from the subsurface.

"Tectonic" means pertaining to, causing or arising from a subsurface region's movement and/or deformation, whether by vibration and/or displacement, including, without limitation, rock faulting, rock folding and/or a volcanic event.

"Calibrated" means to bring a numerical model to a state consistent with observed conditions within a degree of deviation acceptable for the desired analysis. Typically, those skilled in the art of formation modeling will calibrate a model to a virgin stress distribution (i.e., before any man-induced, stress-altering event occurs in the formation). It will be understood, however, that a model can be calibrated to another stress state of interest including, without limitation, a formation's present-day, non-virgin stress distribution, by first calibrating to a virgin stress distribution based on stress data obtained (i) from at least one location in the formation not materially affected by the man-induced event and/or (ii)

before the man-induced event occurred in the formation. Once a formation is calibrated to its virgin stress distribution, any man-induced, stress-altering events can then be accounted for to bring the model to a present-day, non-virgin stress distribution.

Description of Selected Specific Embodiments

FIG. 1 presents a flow diagram illustrating a geomechanical modeling method 100 according to one embodiment. The method 100 sets out steps that may be followed for the purpose of developing a numerically tractable, multi-scale geomechanical modeling framework suitable for computer simulation.

In accordance with the method 100, the first step is to establish a geologic structure for the reservoir under study. This step is represented by Box 110. The purpose is to create a three-dimensional, map-based model from subsurface data.

In creating the geologic structure 110, the geologist or engineer (sometimes referred to generically herein as "the analyst") acquires one or more types of subsurface data. Such data may include well logging data, seismic data, or reservoir simulation data. The analyst then applies certain computer-implemented tools to generate a map representing the geological structure of the production area.

Figure 2:
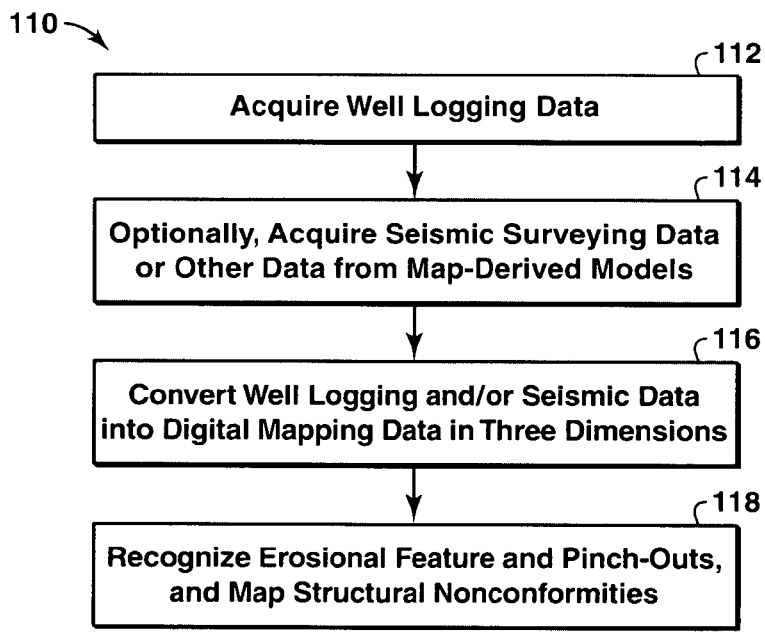
FIG. 2 is a flow diagram illustrating steps for establishing the geologic structure for the geomechanical modeling method of FIG. 1, in one embodiment.

Preferred steps for creating the geologic structure 110 are generally outlined in FIG. 2. FIG. 2 provides a flow diagram illustrating steps for establishing the geologic structure for the geomechanical modeling method of FIG. 1, in one embodiment.

As indicated in FIG. 2, the analyst may acquire well logging data. This step is shown at Box 112. One of ordinary skill in the art will understand that a well log relies upon a sensing device that is run down a wellbore, typically on a wire line. Well logs provide interpretative evidence as to the make-up of a formation as a function of depth. Examples of well logs that might be employed in step 112 to create the geological structure 110 include gamma ray logs, density logs, resistivity logs, porosity logs and sonic logs.

The analyst may also acquire data from "map-derived models." This is shown in Box 114 of FIG. 2. Map-derived models would typically include data that exists from field-wide surveys. Such surveys may include well logging data from wells around the field. However, such data primarily includes seismic surveys across an area under study.

As one of ordinary skill in the art will understand, seismic exploration methods are employed for the purpose of obtaining knowledge about geological structures in the subsurface. Seismic exploration represents an attempt to map the subsurface of the earth by sending sound energy down into the ground, and then recording the "echoes" that return from the rock layers below. The source of the down-going sound energy might come from explosive charges or seismic vibrators on land, or air guns in a marine environment.

Seismic testing employs sensors such as geophones and hydrophones. The sensors are lined up successively to receive the returned waves, or echoes. The returning waves are registered on the surface by the sensors as digital samples. The digital samples are usually acquired at 0.004 second (4 millisecond) intervals, although 2 millisecond and 1 millisecond intervals are also known. Thus, each sample is associated with a travel time, including a two-way travel time in the case of reflected energy.

During a seismic survey, the energy source is moved across the surface above the geologic structure of interest. Each time the source is detonated, it is recorded at various locations on the surface of the earth by the sensors in the form of a time series. Such a time series represents the incoming seismic energy by amplitude variations. Multiple explosion/recording combinations are combined to create a near continuous profile of the subsurface that can extend for many miles. The end result is a depiction of the geological layers.

In the step of establishing the geologic structure 110, the analyst will take the well log and/or seismic data and convert it into a digital representation of a subsurface area. This is shown in Box 116 of FIG. 2. Preferably, the data from the seismic surveys and well logging data is input into a known geological gridding program. An example of such a program is FloGrid™ offered by GeoQuest of Houston, Tex. GeoQuest is the software division of Schlumberger Information Solutions (SIS), an operating unit of Schlumberger OilField Services. The FloGrid program is described in U.S. Pat. No. 6,106,561 which is incorporated herein by reference in its entirety.

FloGrid™ is most typically used as a "pre-processor" for reservoir analysis. FloGrid™ constructs fluid-flow simulation grids for use in a reservoir simulator such as Schlumberger's ECLIPSE™ program. Reservoir data such as the porosity and permeability of the rock matrix is loaded into the program, and a simulation grid or "mesh" is created for the reservoir simulator.

A reservoir simulator, in turn, creates a mathematical model of a reservoir. In operation, a designated reservoir volume is divided into a large number of interconnected cells. The average permeability, porosity and other rock properties is then estimated for each cell. The process makes use of data from well logs, seismic surveys, and rock cores recovered when wells are drilled. Production from the reservoir can then be mathematically modeled by numerically solving a system of three or more nonlinear, partial differential equations describing fluid flow in the reservoir.

In the method 100, the geological gridding program is being used as a map-based model for the geological structure 110. However, the map-based model will not be entered into a traditional reservoir simulator; rather, as will be described more fully below, the geological structure 110 created from the map-based model will be converted into a finite element model. In this way, geomechanical stress modeling can be conducted.

The mesh that is created by FloGrid™ and other known geological analysis software programs is generally horizontal. This means that a two-dimensional map is created based upon the subsurface data that is loaded into the pre-processor. In other words, the data is used to create a two-dimensional representation of the production area under study at a selected depth. However, a multi-scale or three-dimensional mesh is not automatically created.

It is known to create a three-dimensional map from a pre-processor program output by stacking a series of two-dimensional representations generated by the program.

However, this is a manual process that tends to be very time-consuming. In practice, the analyst acquires logging data from various exploratory wells. Depth corrections may be made, and the well logs are then used to identify strata and perform depth correlations between wells. Subsurface structures or facies may then be mapped through a process of manually stacking layers.

The present method 100 employs, in one aspect, a modified pre-processor that includes an automatic stacking function. This means that the conversion step 116 automatically creates a three-dimensional model from the survey data without having to manually stack sequential horizontal layers. The modified pre-processor can stratify the subsurface formation under study and map properties that are common to wells. Optionally, the modified pre-processor can also derive properties such as elastic constants in order to provide a mechanical description of the layered structure that has been upscaled from a two-dimensional model.

To prepare the three-dimensional model, the layer structure and layer properties are derived from the well logging data obtained in step 112 and the seismic survey data obtained in step 114. The data is correlated with depth, and then merged with the modified pre-processor software to create the geological structure 110. In this manner, a three-dimensional map is automatically created. The map includes data at various strata including porosity, permeability, temperature and pressure.

In order to provide the automatic three-dimensional conversion, an ASCII Data-to-ZMap programming function may be used. ASCII is an acronym for "American Standard Code for Information Interchange." This is a character encoding program based on the English alphabet. In general, ASCII is a seven-bit code, meaning it uses bit patterns represented with seven binary digits (a range of 0 to 127 decimal) to represent character information.

The character information is converted to a ZMap file format. "ZMap" is a name given to a particular industry file format having its own characteristic header information. Header information describes the size of the domain, that is, the min-x, the max-x, the min-y, and the max-y. This, in turn, is a reference to the offset from some global reference coordinate in a given plane or depth. The ZMap program provides a corresponding "z" coordinate value for each reference point within the plane. The "z" coordinate value corresponds to elevation or surface changes at the various locations within the plane. Thus, the ZMap format places the coordinate data in a particular format such that a description is provided in three dimensions, to with, "x," "y" and "z."

In operation, the modified pre-processor interpolates points in the ZMap format from the map-derived model in order to provide additional data points for building the three-dimensional structure 110. The Z-map file produces collapsed nodes where unconformities, pinch-outs and erosive zones occur. As discussed further below, positive volume is accorded to these collapsed nodes to correct for unconformities, pinch-outs and erosive zones.

It is also noted that when a two-dimensional mesh is created by FloGrid™ or other geological analysis software, the mesh is not only horizontal, but is also in the form of a very thin layer. When the collective thin layers of meshes are stacked under a known manual technique, the new three-dimensional mesh does not accurately recognize erosional features and pinch outs that may naturally exist in the reservoir.

Figure 3:
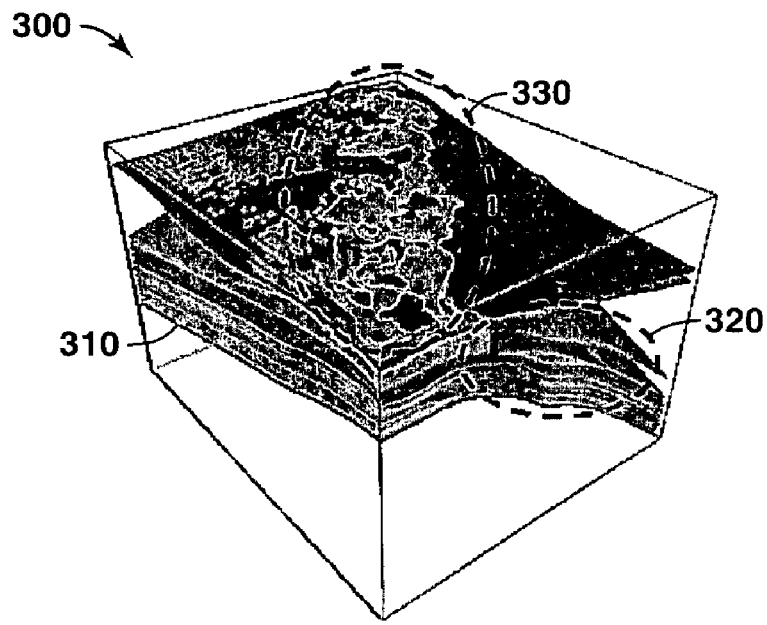
FIG. 3 is a sectional view of an illustrative oil reservoir which is being modeled. The oil reservoir is the product of survey data that has been taken from geologic structures and translated into stratigraphic layers. A series of stratigraphic layers is seen.

FIG. 3 is a cross-sectional view of an illustrative oil reservoir 300 which is being modeled. The oil reservoir 300 is the product of survey data that has been taken from geologic structures, and translated into stratigraphic layers 310 in accordance with steps 112-116. A series of stratigraphic layers 310 is seen in FIG. 3.

In FIG. 3, the layers 310 include an area of "pinchout" 320. In addition, the layers 310 include erosional features 330. Pinchouts and erosions, or vanishing layer thicknesses, may arise from tectonic forces within the earth and from erosion. The presence of pinchouts 320 and erosive zones 330 makes it more difficult for an analyst to develop a numerically tractable geomechanical model for field-wide computer simulation. Indeed, correcting numerical singularities with human interactions, even aided by existing CAD (computer aided design) tools, can be prohibitively time consuming for generating accurate computer models. Therefore, an optional aspect of the geomechanical modeling method 100 is to recognize erosional features and pinch outs and to map such structural nonconformities as done in FIG. 3. This is indicated in FIG. 2 by Box 118.

To take into account structural nonconformities, a process has been developed to sort through the depth of the geologic structures and to identify geologic singularities such as pinchouts 320 and erosion features 330. Once such features 320, 330 are identified, correct depth ordering is restored. In addition, using the modified pre-processor, regions of zero thickness are assigned with a positive volume along with flow and structural properties that approximate the singular features.

In order to identify geological nonconformities, the modified pre-processor checks the nodes created from the map-based geological model 110. Checks are conducted at incremental locations to determine whether the depth represents an increasing order. If the order is non-increasing, this indicates that some of the nodes penetrate to other layers. This signifies an erosive zone. On the other hand, if there are nodes having the same depth, this indicates a collapse. This, in turn, signifies a pinchout.

When either of these conditions is determined, the elements have a zero thickness. To correct for the noncomformity, the element is given a positive thickness. This provides for volume.

In order to create a mesh acceptable for finite element analysis, the pre-processor should scan all nodes in the x- and y-directions through the depth of the geomechanical system to identify these nodes. When these singular nodes are identified, an appreciable pinch-out relief distance must be given to create elements of positive volume. Stated another way, the pre-processor separates the nodes by a given thickness in the vertical direction between two nodes. This process is repeated until all the nodes are separated from each other. Consequently, all elements are assigned a positive volume.

It is noted that the mesh, or map-based model, that is generated from the modified pre-processor represents data that resides in a digital domain. In other words, as a result of establishing the geologic structure 110, a subsurface structure is mapped and discretized in a particular domain. That domain has certain local coordinates within the domain. Boundaries are provided at the outer edges of the domain. The boundaries are defined by certain parameters referred to as boundary conditions. Such parameters for an oil reservoir simulation may include the formation pressure and temperature history. This information is generated from the subsurface data acquired in the steps 112 and 114. This information may also be obtained from other reservoir flow simulations. Such information may be adopted as sets of boundary conditions for the geologic structure 110.

It is desirable to represent the local coordinates and boundary conditions in the geological structure 110 in terms of nodes within a finite element analysis domain. In this way, geomechanical modeling can be conducted. Thus, referring back to FIG. 1, a next step in the modeling method 100 is the creation of a finite element mesh. This step is illustrated at Box 120. The purpose of step 120 is to take the mesh representing the geologic structure 110 (a map-based model) and convert it into a mesh 120 for finite element analysis.

Figure 4:
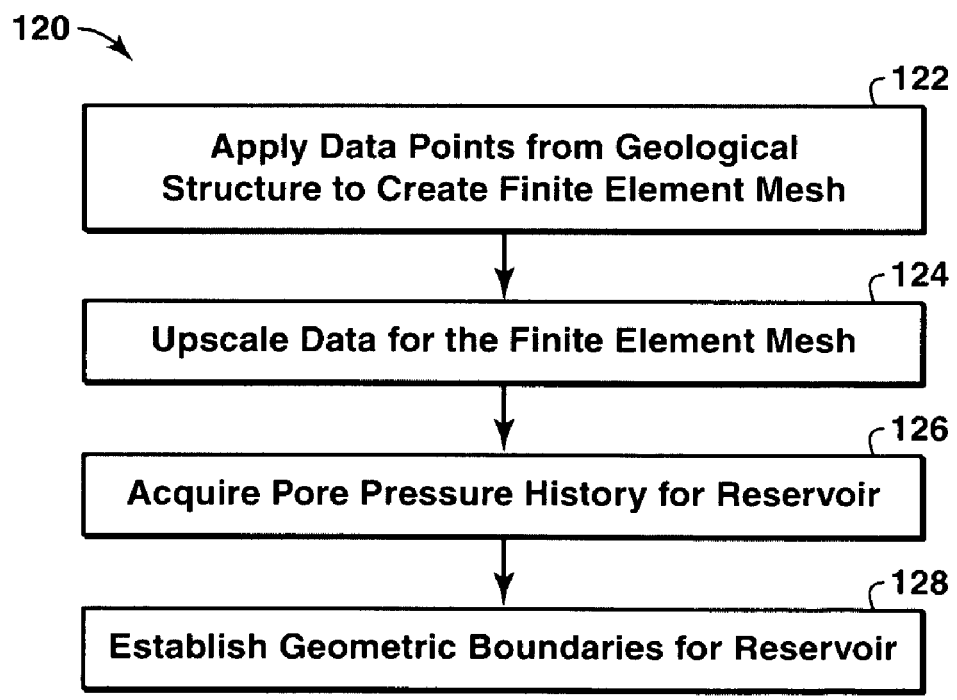
FIG. 4 is a flow diagram illustrating steps for creating the geomechanics finite element mesh from the geomechanical modeling method of FIG. 1, in one embodiment.

FIG. 4 presents procedures in connection with step 120. Under step 120, a geomechanics finite element mesh is created. In order to create the finite element mesh 120, data points are taken from the geologic structure 110, and then input into a utility program. This is shown at Box 122 of FIG. 4.

In creating the new mesh 120, the production history is first considered. The production history, which includes pressure and temperature mapping, is carried out using a weighting algorithm. The weighting algorithm relies upon search volumes. Preferably, the search volumes are ellipsoids. This means that a search ellipsoid is defined around each node. Ellipsoids (such as in the shape of a football) are preferred because the reservoir thickness is small compared to the other two dimensions. This gives the user the flexibility to approximate most volumes by adjusting its semi-axes. For example, the ellipsoid equation may be modified to a plane domain by assigning larger semi-axes in the in-plane directions, and smaller values in the thickness direction. However, it is understood that other search volumes such as cylinders may be used as part of the algorithm.

The algorithm uses a distance-space weighted function to find a base value to represent the pore pressure in the geomechanical model. In other words, the weighting scheme is based on distance between the geomechanical node and the reservoir analysis node. In the preferred embodiment, a three-dimensional weighting scheme is formulated whereby nodal quantities for the geomechanical simulation 110 are mapped from a spatial neighborhood of reservoir simulation gridpoint quantities. The reservoir simulation gridpoints are known for their pressure and temperature from the pre-solved reservoir analysis.

In operation, the weighting scheme calculates the nodal quantity p(r) in the geomechanical model based on the nodal quantity $P_i$ from the reservoir analysis gridpoints through the following equation, $$p(r) = \frac{\sum_i w_i P_i}{\sum_i w_i}$$

in which, $$\frac{1}{w_i} = \frac{(r_x - \xi_x)^n}{a^n} + \frac{(r_y - \xi_y)^n}{b^n} + \frac{(r_z - \xi_z)^n}{c^n}$$

wherein,
r is the position vector of a geomechanical node;
$r_x$, $r_y$, and $r_z$ are the position vectors of the reservoir analysis nodes, respectively;
a, b, c are the semi-axes of the three principal directions of a searching ellipsoidal domain;
n is the power of weighting; and
$w_i$ is the distance based weight.

The property is mapped based on the property (e.g. pressure or temperature) of the surrounding reservoir analysis gridpoints inside the searching ellipsoid.

p property at geomechanical node
P property at reservoir gridpoints
$w_i$ distance-based weight
r geomechanical nodal position vector
$r_x$ x component of geomechanical nodal position vector, m
$r_y$ y component of geomechanical nodal position vector, m
$r_z$ z component of geomechanical nodal position vector, m
$\xi$ reservoir analysis nodal position vector
$\xi_x$ x component of reservoir analysis nodal position vector, m
$\xi_y$ y component of reservoir analysis nodal position vector, m
$\xi_z$ z component of reservoir analysis nodal position vector, m
a semi axis of searching ellipsoid in x direction, m
b semi axis of searching ellipsoid in y direction, m
c semi axis of searching ellipsoid in z direction, m
n exponent of weighting It should be noted that in many cases, the volume of data used in a geologic model is much greater than what is needed or desired in creating a finite element model. Therefore, one optional aspect to the step 120 is "upscaling" or reducing the amount of data while maintaining an accurate mathematical description. This is shown in Box 124. Upscaling is an integral feature to most gridding programs, including FloGrid™

The purpose for creating the finite element mesh 120 is to determine movement of the rock matrix within the reservoir under study in response to changes in fluid pressure. In addition, movement of the rock matrix within the reservoir in response to changes in temperature may be determined. Finite element analysis allows the analyst to determine the response of the "elements" to changes in the geomechanical system. In order to meet this purpose, the pore pressure and, optionally, the temperature within the reservoir is initialized at various points. In practice, information concerning pore pressure history inside the reservoir is acquired. The step of acquiring historical pore pressure data is indicated in Box 126.

The known points of data are referred to as "nodes." Each of the nodes is mathematically provided with one or more degrees of freedom. This is part of the "discretization" or "mesh generation" process. The degrees of freedom represent permitted movements in the rock in response to changes in fluid pressure during production or injection. These may also be referred to as "Gaussian integration points." A mathematical approach is taken to describe how each point or node displaces relative to each other for a given initialized state.

In addition, the reservoir has physical boundaries. Boundaries are provided at the outer edges of the domain. The boundaries have known (or approximated) pore pressure values and geomechanical properties. The pore pressure and geomechanical values at the boundaries represent the "boundary conditions."

In an oil reservoir simulation, a finite element model traditionally seeks to represent properties of the reservoir by using a mathematical function which gradually changes according to the position within the reservoir boundaries. However, it is difficult to force these functions to approximate changes in the properties which occur very abruptly as a result of geological features within the reservoir. For instance, a reservoir may have two distinct layers, each of which has a substantially different value for a given property (e.g., porosity) at the boundary between these two layers. A mathematical function representing the value of the properties might therefore have to make an immediate transition from one value to the other at the boundary between the layers. Therefore, as noted above, a utility computer program is offered which incorporates repair capabilities to convert the geologic structure 110 into the finite element geomechanical model 120. Consequently, two constitutive material models are preferably given to these two layers. The governing equation then incorporates these two material models into sets of equations to be solved. The compatibility and force (flux) equilibrium will be satisfied as the equations are solved.

In connection with establishing boundary conditions, the geometric boundaries themselves need to be established for the reservoir. The step of establishing boundaries for the geomechanical model is indicated at step 128.

As part of establishing boundaries, the geomechanical stresses assumed for the production area under study may need to be adjusted. For example, the model may need to be adjusted to reflect in situ tectonic forces acting upwardly from below the production area under study. Alternatively, the model may need to be adjusted to reflect in situ tectonic forces acting from one side of the production area under study. Alternatively still, the model may need to be adjusted to reflect an overburden acting downwardly on the production area under study. In this way, initial stresses on the production area are more accurately characterized.

In the present method of geomechanical modeling 100, the external stresses, be they under-, over-, or side-burden, may be generated through a process of extrapolation. This means that information from inside of the domain or production area under study 120 is extrapolated to outside of the domain. This is done by using the geomechanical model that incorporates the weight of each individual layer including under- or over- or side-burden, the hydrostatic load on the surface of the overburden and far field boundary conditions to reach a "geo-static" equilibrium under several iterations. A "geo-static equilibrium" means the model carries some initial stress where the model yields non-appreciable displacements before any human interference.

Alternatively, stress data may be obtained from an interpolation of neighboring fields and/or neighboring wells. This means that far-field boundary conditions are considered, and then the data is "filled in" for the production area under study. This may be done, for example, by leak off tests from downhole measurements.

In some instances, the production area under study may be too close to a model boundary. When this occurs, it may be desirable to expand the domain by adding a side-burden. This is done by extending the boundary of the model by adding side-burden to the original model. Preferably, the side-burden is at least three times larger than the original model.

A next step in the geomechanical modeling method 100 is the input of rock material properties into the finite element mesh 120. Rock material properties refers to the constitution or makeup of the rock as well as its permeability, its porosity, its elasticity, and other features. The step of inputting rock material properties is shown at Box 130 of FIG. 1.

A variety of tools may be used to acquire information concerning rock material properties. One source of data is core test data. Core test data refers to data taken from core samples. This may include rock lithology, porosity, and permeability. Various tests may be run on core samples in order to acquire this information. Core samples are considered the most useful source of rock data since they provide tangible and physical information concerning the make-up of subsurface rock formations at given depths.

Loading tests may also be performed in order to determine the rock's elastic properties. Typical tests include cyclic conventional geomechanics tests, uniaxial tests, or triaxial tests. The tests may be performed on the core samples in both drained and un-drained conditions, that is, in both dry and saturated conditions. For example, a sample may be taken to failure under load to determine failure properties so as to map the rock in a Mohr Coulomb or Drucker-Prager analysis. Such analyses may provide Young's modulus, Poisson's ratio, Lame' constants, and other rock properties that may be calculated according to formulae known by those skilled in the art of geomechanics. Other "critical state" models such as the Cam-clay model are known and may also be used. In any instance, the rock material/property model 130 is constructed using either elastic or elastoplastic models based on the analyst's judgment.

In connection with an evaluation of geomechanical stresses and failure criteria, it is generally recognized that rocks are strong in compression but weak in tension. This is particularly true for rocks with natural fractures. For these rocks, compressive stresses will tend to leave fractures closed, but tensile stresses will open the rock and encourage fracture growth. By this criterion, any portion of a rock subjected to tensile stress is likely to fail. Tensile stresses may come into play in an overburden where fluid is removed from a subsurface formation.

In practice, failure points are determined by breaking core samples in compression under different confining pressures. The uniaxial and triaxial compression laboratory test procedures and calculations used to define the failure line in a Mohr-Coulomb analysis are known to those of ordinary skill in the art of geomechanics. When considering porous rocks with an internal pore fluid under pressure, the stresses correspond to "effective stresses." The "effective stress" on a porous rock is the normal total stress minus the pore fluid pressure. The concept of "effective stress" and its use is also known to those skilled in the art.

Well log data is also used to assess rock material properties. Data derived from well logs may inform as to both rock makeup and elastic properties. For example, gamma ray logs and density logs are useful in determining the amount of shale in a rock, which infers the presence of clay. Sonic logs can be used to calculate elastic properties. Porosity logs may also be used for porosity determinations.

It is noted that the geomechanical modeling method 100 may employ constitutive models when analyzing rock properties 130. A constitutive model takes into account the fact that certain properties normally considered to be constant, such as porosity, may change in response to other factors such as stress or strain or temperature. Constitutive behavior represents a modeling framework which captures the evolution of a particular material property over time. The constitutive model provides a mathematical model that describes how those properties evolve as a function of some other parameter, usually in time.

In the context of the utility program for the finite element mesh 120, the constitutive model may be prepared by assigning the Young' modulus, Poisson's ratio, initial yield stress, friction angle, plastic hardening curve, or other factors compiled from laboratory core test results. The selected values are assigned to the finite element mesh.

For a formation under geomechanical study, the formation thickness is also an important parameter. The thickness of the formation may change in response to stress, strain, temperature, or other factors. Geomaterials also exhibit pressure-dependence. Therefore, built into the framework of the mathematical Mohr-Coulomb/Drucker Prager failure criteria is the failure behavior of the rock in response to changes in pressure.

The mathematical framework also takes into account the failure mode of the rock. For example, if the rock is elastic it is generally going to reform back to its original shape in response to stress. However, if the rock is plastic it is more likely to shear in response to stress. The failure mode may also take into account whether a particular rock may shear under compression, or form shear bands. The response of a rock matrix may be calibrated with laboratory tests to determine response for plastic behavior or nonlinear elastic behavior. The failure mode may be analyzed mathematically using geomechanical properties, such as the Mohr-Coulomb failure criteria.

A next step in the geomechanical modeling method 100 is geostatic initialization. This step is indicated at Box 140. The purpose of this step 140 is to initialize the geomechanical condition of the formation at issue.

The geomechanical initialization step 140 relies upon a variety of information that is mathematically incorporated into the utility program of the mesh 120. This information may come from well log data, drilling records, and/or initial well test data. The initial stress state is calculated and calibrated based on this information. Optionally, far-field boundary conditions are imposed on the created geomechanical model as described above in connection with step 128.

Figure 6:
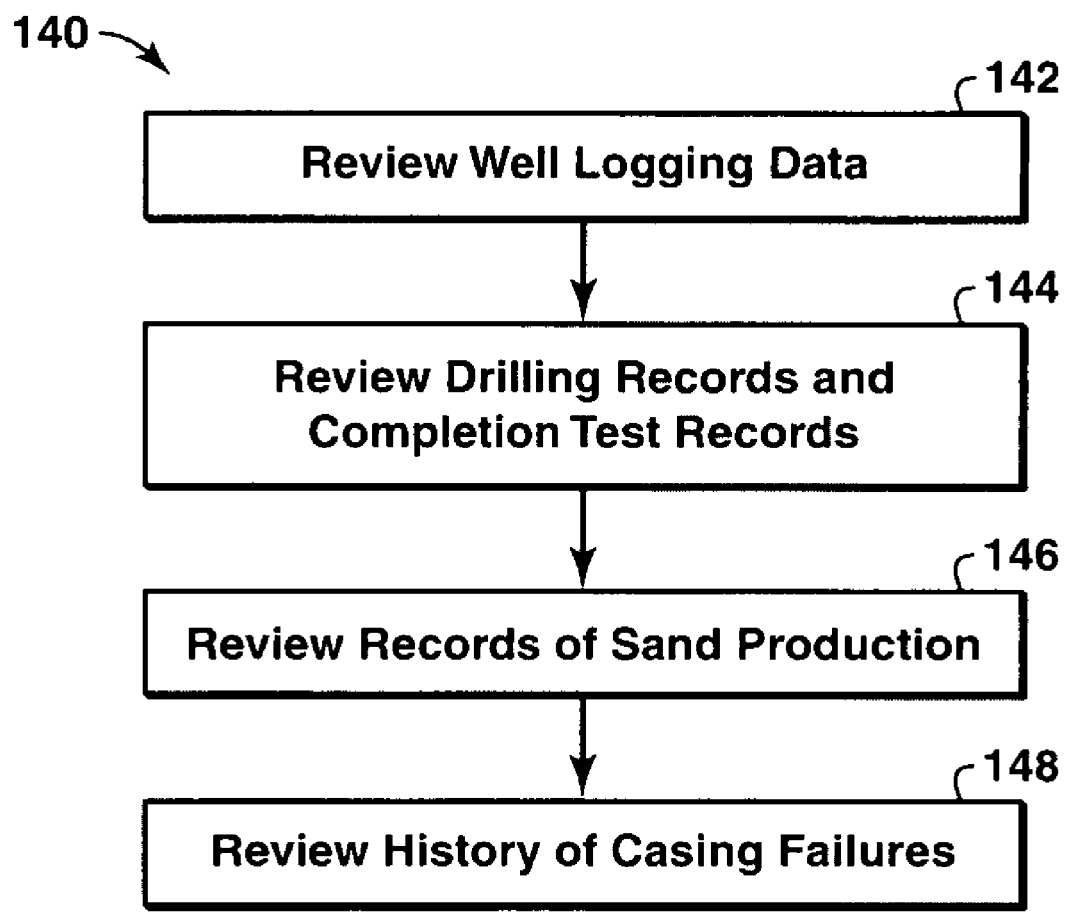
FIG. 6 is a flow diagram illustrating steps for initializing the geostatic condition of the geomechanical modeling method of FIG. 1, in one embodiment.

FIG. 6 provides a flow chart that outlines data considered in connection with the geomechanical initialization step 140. First, various well logging data may be used. This is shown at Box 142. Examples of well logs that may be consulted include density logs, FMI logs and caliper logs.

Density logs inform the analyst as to the density of the formation under study. This is useful as it is used to distinguish the producing and non-producing layers.

FMI logs, or "formation microimaging" logs, detect fractures within the formation. Such fractures may either be naturally occurring fractures, or may be induced by fluid pressures inherent in the drilling process. FMI logs are instructive as they indicate the strength of the rock formation.

Finally, the caliper log measures the radius of a wellbore as a function of depth. The caliper log can provide an indication of washouts, borehole collapse, or other drilling-induced variations in radius. This also may be indicative of rock strength.

Next, the analyst may consider drilling records and completion test records. This is shown at Box 144. Drilling records may record instances of fluid loss or "lost returns" during wellbore formation. This, in turn, is also indicative of formation strength. In some instances, leak-off tests are performed during the drilling process in order to intentionally step right up to the fracture gradient of the formation at selected depths. The analyst may use this information to more accurately characterize pressures and stresses.

Records of sand production within the development area may also be instructive. This is shown at Box 146. In this respect, the presence of sand production from a certain depth informs the analyst about the mechanical characteristics of the formation, particularly at the face of the formation. For example, the presence of sand in the production fluids is an indication of the cementation strength of the formation. This, in turn, may assist in calibrating failure criteria.

Finally, information concerning the history of casing failures in the development area would also be highly useful. This is shown at Box 148. If casing failures have occurred, this probably is evidence of formation shear occurring in the region as a result of subsidence or heave. This would suggest potentially weak facies. For example, a formation comprised of bentonite or other depositional phase material might not show up in the log data. Bentonite is considered to have a low internal friction or low cementation, meaning that it is weak. Bentonite and shale formations are considered to be strong in compression but weak in shear.

A next step in the geomechanical modeling method 100 is actually running the program. This step is indicated in FIG. 1 at Box 150. In order to run the utility program, the data is input into a simulator or "solver." A solver is a program that is able to solve the governing equations of interest. In geomechanics, the solver finds the solution that satisfies force equilibrium, compatibility and constitutive laws. In one aspect, the program is an available geomechanics software program such as ABAQUS™.

Because the mesh lies within a producing zone, the pore pressure within the mesh or inside the "producing mesh domain" will change as a function of time. Using the finite element analysis mesh 120, as the pressure changes, stresses acting inside of the mesh may be predicted. As will be discussed in further detail below, such stresses may include a compaction strain ($\epsilon_{3-3}$) and out-of-plane shear strains ($\gamma_{1-3}$, $\gamma_{2-3}$).

Figure 5:
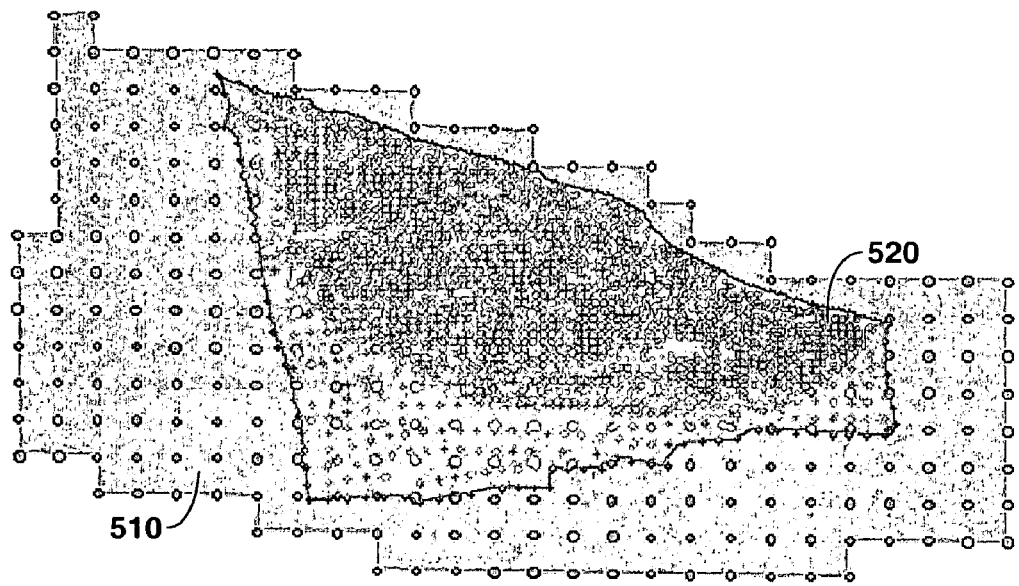
FIG. 5 indicates operation of two reservoir flow simulators. The first is a series of ABAQUS-modeled nodes set out in a uniform grid. This is from a finite-element analysis. The second is a map-based mesh.

FIG. 5 indicates the operation of the utility program and the subsequent ABAQUS simulator. Two reservoir flow simulator grids 510, 520 are shown. Simulator 520 represents the reservoir model grid blocks or gridpoints from the finite element mesh 120. The other simulator 510 is a series of ABAQUS-modeled nodes. The ABAQUS™ simulator sets out the nodes from the reservoir simulator into a more uniform grid.

To solve for earth stress changes, a matrix is created within the physical boundaries. The matrix defines the properties of the various elements within the physical boundaries. The matrix includes a vector that defines the forces acting on each element in the structure. Once all the element matrices and vectors have been created, they are combined into a structure matrix equation. The structure matrix equation relates nodal responses for the entire structure to nodal forces.

After applying boundary conditions, the structure matrix equation is solved to obtain unknown nodal responses. Intra-element responses can be interpolated from nodal values using the functions which were defined over each element. Such interpolation is done through the utility program.

It is noted that most commercial reservoir flow simulators such as ECLIPSE™ only predict pressure and temperature changes within the reservoir. Such simulators lack the capability to solve for earth stress changes within and outside the reservoir. However, a separate solver such as ABAQUS™ allows the simulator to solve for the earth stress changes. Again, these may represent a compaction strain ($\epsilon_{3-3}$) and out-of-plane shear strains ($\gamma_{1-3}$, $\gamma_{2-3}$).

It is noted that in the creation of the geomechanical model 120, the model may represent a large area, for example, up to 100 miles by 100 miles. Within this model 120, a series of elements that are, for example, a half mile by a half mile in area may be created. However, it may be desirable for the analyst to inspect or understand the geomechanical condition of a smaller area within an individual element. Accordingly, a submodeling technique has been developed that allows the analyst to more accurately characterize a smaller portion or domain of a production area under study. Stated another way, submodeling means the ability to analyze or "zoom in" on a smaller domain within the overall production area.

The submodel defines a complimentary finite-element-based submodel having increasing levels of refinement from the finite element mesh. By increasing the level of refinement, the resolution is improved due to the smaller domain and the presence of additional elements employed in the submodel. It is understood that it is not practical to have small element sizes of, perhaps, several feet when the region of interest is in excess of, perhaps, 100 or more miles. By progressive transition from a larger global model to a smaller submodel, the program can more accurately solve the physical variables of interest.

As noted, the overall model 120 is defined by the boundary conditions established in the program (steps 120, 130 and 140). Such boundary conditions may include a distributed load representing the weight of the overburden. The boundary conditions may also include the internal pressure and temperature boundary conditions as a function of depth. From there, submodeling of the production area under study may be applied.

The submodeling takes into consideration the production history within the reservoir. This includes drawdown information, depletion history, historical production rates, individual well tests, and post-completion well logs. The submodeling may also take into consideration casing failures that may have occurred within the field under study. As will be described further below, well failure history is also analyzed as part of a predictive model 1000.

In order to create the submodel, the operator identifies a region of interest. Then appropriate submodel boundaries are defined. The submodel is assigned a more discretized mesh to obtain better resolution of physical properties. This process could be repeated for several levels, meaning that two, three, four or "n" number of size domains may be consecutively analyzed to allow the operator to zoom in to a point within the reservoir model. For example, the operator may move from a global level that is 100 miles×100 miles, to several intermediate submodels that are 1 mile×1 mile, and finally to a near well bore level that is 1 foot×1 foot. The benefit is that strain values ($\gamma_{1-3}$, $\gamma_{2-3}$) may now be determined at nodal points in the finite element mesh.

Figure 7:
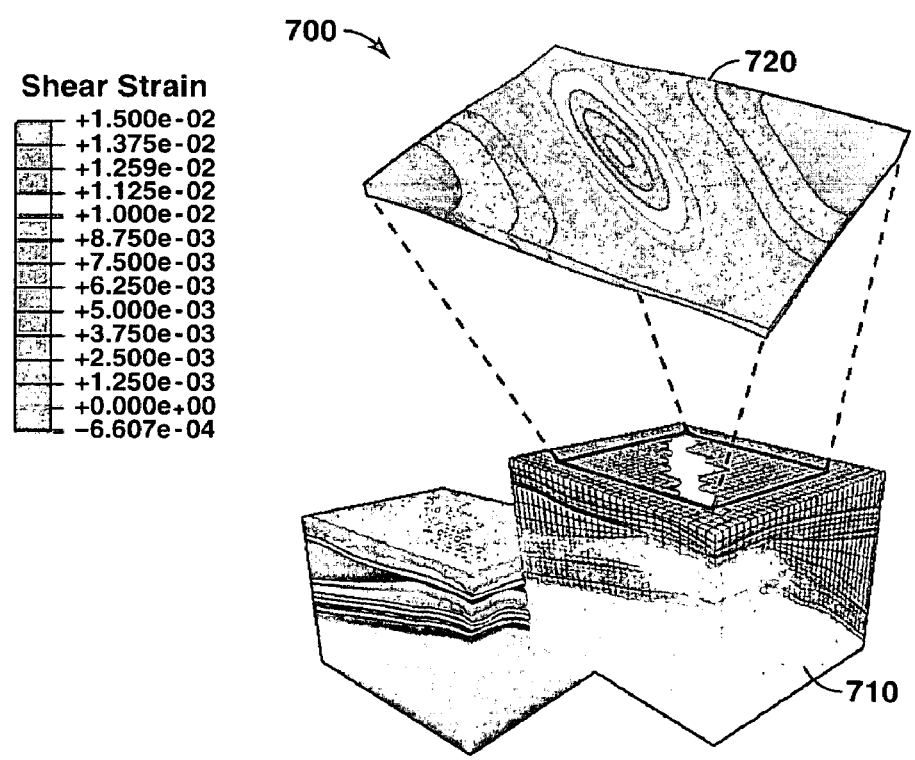
FIG. 7 presents a sectional view of a global model and submodel of a geomechanical model without nonconformities. The inset of FIG. 7 shows the contour of effective shear strain of a submodel caused by in-situ stress changes from production.

FIG. 7 presents a sectional view of a global model 700. The model 700 demonstrates a formation 710 under study. In this illustrative embodiment, the formation 710 is without nonconformities.

In FIG. 7, an inset 720 is shown. The inset 720 demonstrates the contour of effective shear strain caused by in-situ stress changes from production. The inset 720 of FIG. 7 shows the contour of effective shear strain of a submodel caused by the in situ stress changes from production. The contour plots shows region of high shear strain acting within a formation. Thus, one result of running the geomechanical simulation model 100 is the ability to determine shear strain forces acting within the formation in response to changes in pore pressure.

Finally, a step in the modeling method 100 may be consistency analysis. This step is shown at Box 160. The purpose for the consistency analysis 160 is to provide a peer review of the results. This, in turn, enhances the accuracy of the modeling method 100.

The peer review may be a human peer review. In this instance, a human peer will exercise his or her engineering mechanics judgment and geomechanics modeling experience to confirm that the results of the simulation 100 are reasonable or acceptable. This step 160 is a subjective review as opposed to simply manipulating data. However, in some cases, the peer review may be conducted through a separate program.

Figure 8:
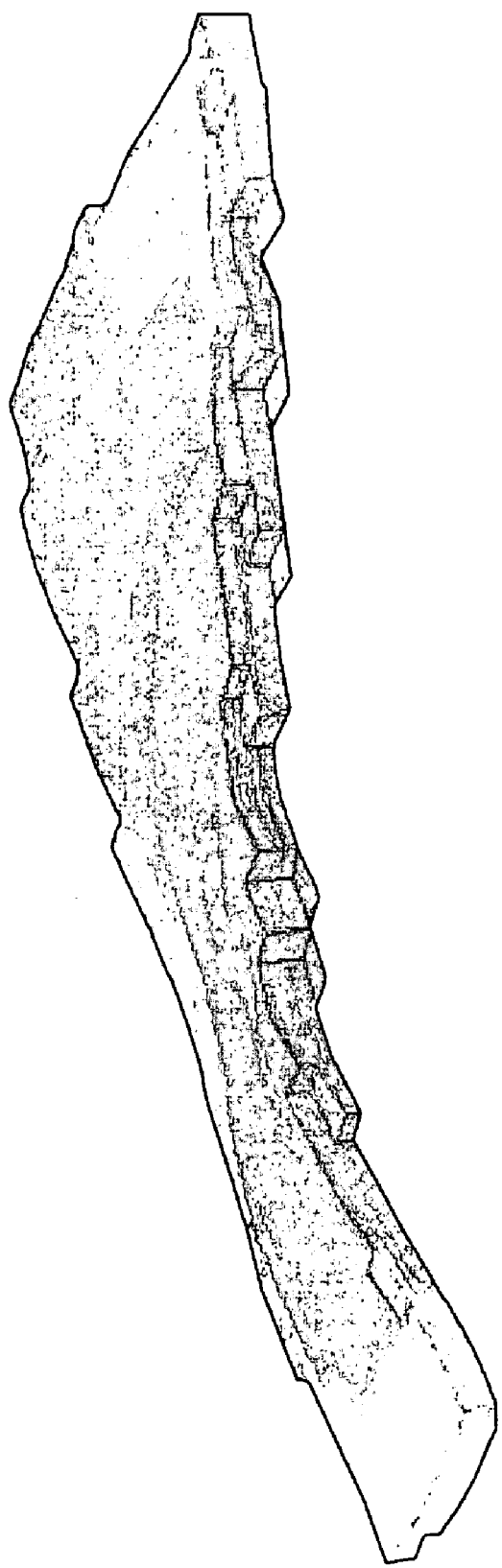
FIG. 8 is a pressure contour plot mapped from a geomechanical modeling simulation.

To demonstrate operation of the method 100, FIG. 8 is provided. FIG. 8 is a pressure contour plot mapped from a reservoir simulation. In this simulation, the exponent of weighting ("n") equals 2. A multi-scale geomechanical simulation is implemented based on an assumed production history. It is noted that a region of high depletion will result in a reduction of pore pressure. This, in turn, will yield higher compaction within the reservoir, potentially leading to surface subsidence.

Figure 9A:
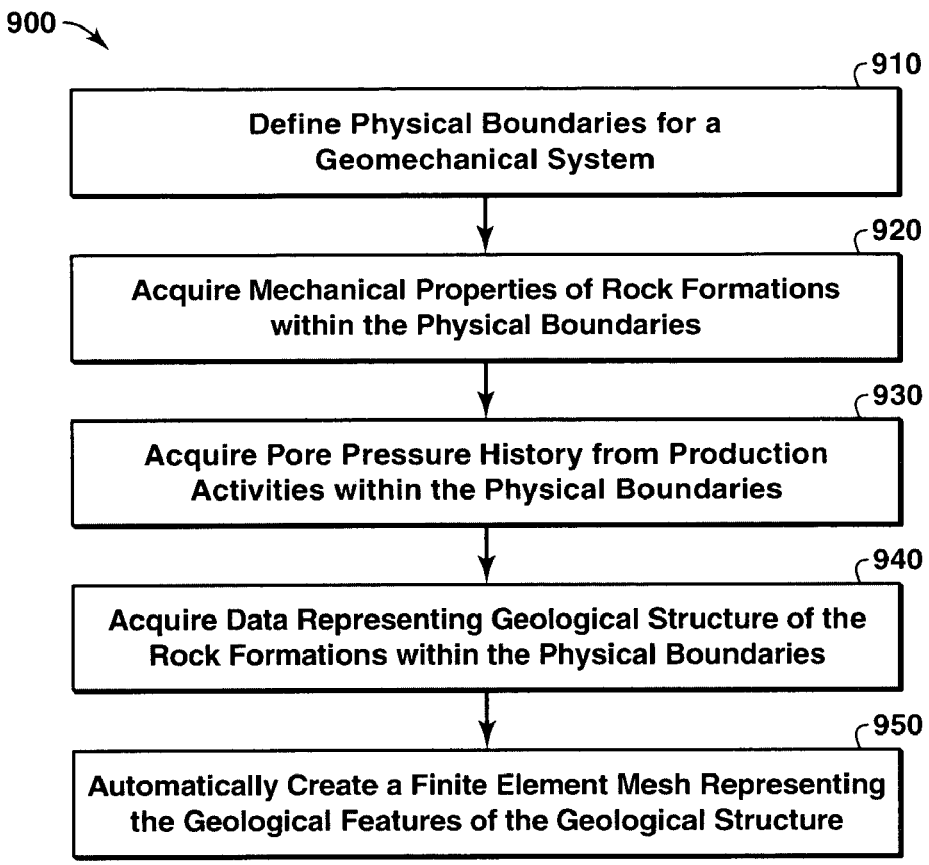
FIGS. 9A and 9B present a flow chart showing steps that may be taken to run a reservoir simulation model in accordance with one embodiment of the present invention.
Figure 9B:
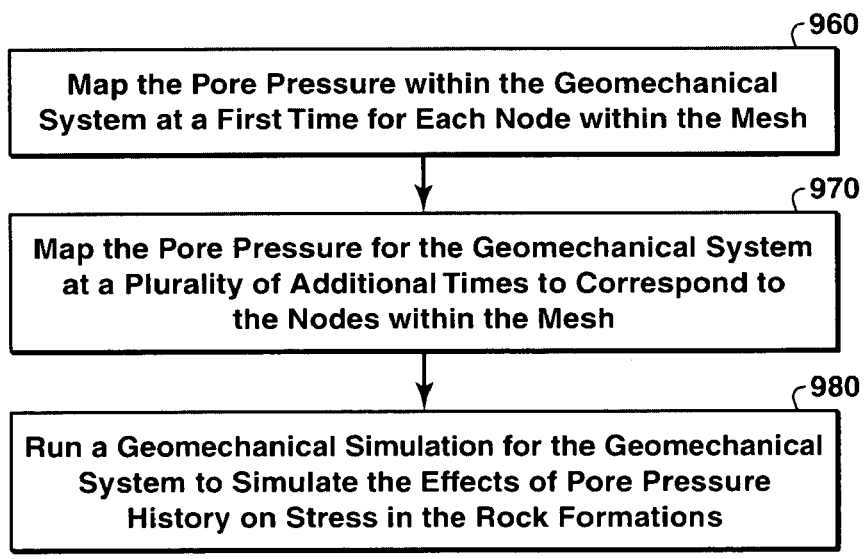

In order to use the geomechanical modeling method 100 to perform reservoir simulation, a series of steps may be taken. FIGS. 9A and 9B together present steps which, in one embodiment, provide a reservoir simulation method 900. The purpose of the method 900 is to evaluate whether changes in reservoir pressure as a result of production activities will negatively affect formation stability. Such production activities may be withdrawal of reservoir fluids from a reservoir, injection of fluids into a reservoir under study, or a combination thereof.

The method 900 may be generally characterized as a computer-implemented method for modeling a geomechanical system. In one aspect, the method 900 first includes defining physical boundaries for the geomechanical system. This step is indicated at Box 910 of FIG. 9A. The step of Box 910 is consistent with Box 128 of FIG. 4, described above.

The method 900 also includes acquiring mechanical properties of rock formations within the physical boundaries. This step is indicated at Box 920 of FIG. 9A. The step of Box 920 is consistent with Box 130 of FIG. 1, described above.

The method 900 also includes acquiring pore pressure history from production activities within the physical boundaries. This step is indicated at Box 930 of FIG. 9A. The step of Box 930 is consistent with Box 126 of FIG. 4, described above. Acquiring pore pressure history 930 may optionally include acquiring other reservoir characteristics such as temperature history, porosity or permeability.

The method 900 also includes acquiring data representing geological structure of the rock formations within the physical boundaries. This step is indicated at Box 940 of FIG. 9A. The step of Box 940 is consistent with Boxes 112 and 114 of FIG. 2, described above. The step 940 may be part of the preparation of a map-based geological model.

The method 900 also includes automatically creating a finite element mesh representing the geological features of the geomechanical system. This step is indicated at Box 950 of FIG. 9A. The step of Box 950 is consistent with Boxes 122 and 124 of FIG. 4, described above. In this respect, step 950 may be the derivation of a finite-element based geological model from a map-based geological model.

The mesh defines a plurality of nodes representing points in space. Each of the points has potential displacement in more than one direction, meaning more than one degree of freedom. Such displacement may be translational in an "x," a "y," or a "z" direction. Such displacement may also optionally be rotational about a plane in the "x" direction, a plane in the "y" direction, and/or a plane in the "z" direction.

It is preferred that the mesh provide a positive value for any rock formations indicated from the data representing the geological structure to have a zero thickness. The purpose is to create volume for that rock formation. In this way, the repair of singular geologic entities such as "pinchouts" and erosional features is automated. The geological structure may be converted into a finite element mesh using a utility program that is compatible with a finite element analysis solver such as ABAQUS™.

The method 900 also includes mapping the pore pressure within the geomechanical system at a first time for nodes within the mesh. This step is indicated at Box 960 of FIG. 9B. The step of Box 960 is different from the step of Box 930, in that the pore pressure history acquired in step 930 is now being loaded into the utility program at the first time.

The method 900 also includes mapping the pore pressure for the geomechanical system at a plurality of additional times to correspond to the nodes within the mesh. This step is indicated at Box 970 of FIG. 9B. This means that the pore pressure history acquired in step 930 is now being loaded into the utility program at a plurality of additional times.

The method 900 includes running the reservoir simulation for the geomechanical system to simulate the effects of pore pressure history on stress in the rock formations. This step is indicated at Box 980 of FIG. 9B. The step of Box 980 is consistent with Box 150 of FIG. 1, described above. The effects may be mathematically quantified in the form of compaction strain values ($\epsilon_{3-3}$) and out-of-plane shear strain values ($\gamma_{1-3}$, $\gamma_{2-3}$) at selected locations within the geomechanical system. Preferably, the out-of-plane coordinates are transverse to the compaction strain coordinate.

Finally, the method 900 includes submodeling in order to determine shear strains acting at a more defined point within the formation. This step is indicated at Box 990 of FIG. 9B. In order to create the submodel, the operator identifies a region of interest. Then appropriate submodel boundaries are defined. This step 990 may be repeated for several levels, meaning that two, three, four or "n" number of size domains may be consecutively analyzed to allow the operator to zoom in to a point within the reservoir model. For example, the operator may move from a global level that is 100 miles×100 miles, to several intermediate submodels that are 1 mile×1 mile, and finally to a near well bore level that is 1 foot×1 foot. In this way, compaction strain ($\epsilon_{3\text{-}3}$) and out-of-plane shear strains ($\gamma_{1\text{-}3}$, $\gamma_{2\text{-}3}$) acting upon a wellbore for a specific well may be determined.

Using the geomechanical model 900, it is also desirable to be able to predict wellbore failures as a result of production activities. Accordingly, a method for predicting well reliability is proposed herein. In one aspect, the method relies upon a simulation model that takes into account formation nonconformities and then allows the analyst to determine compaction strain ($\epsilon_{3\text{-}3}$) and out-of-plane shear strains ($\gamma_{1\text{-}3}$, $\gamma_{2\text{-}3}$) at specific nodal points.

Figure 10:
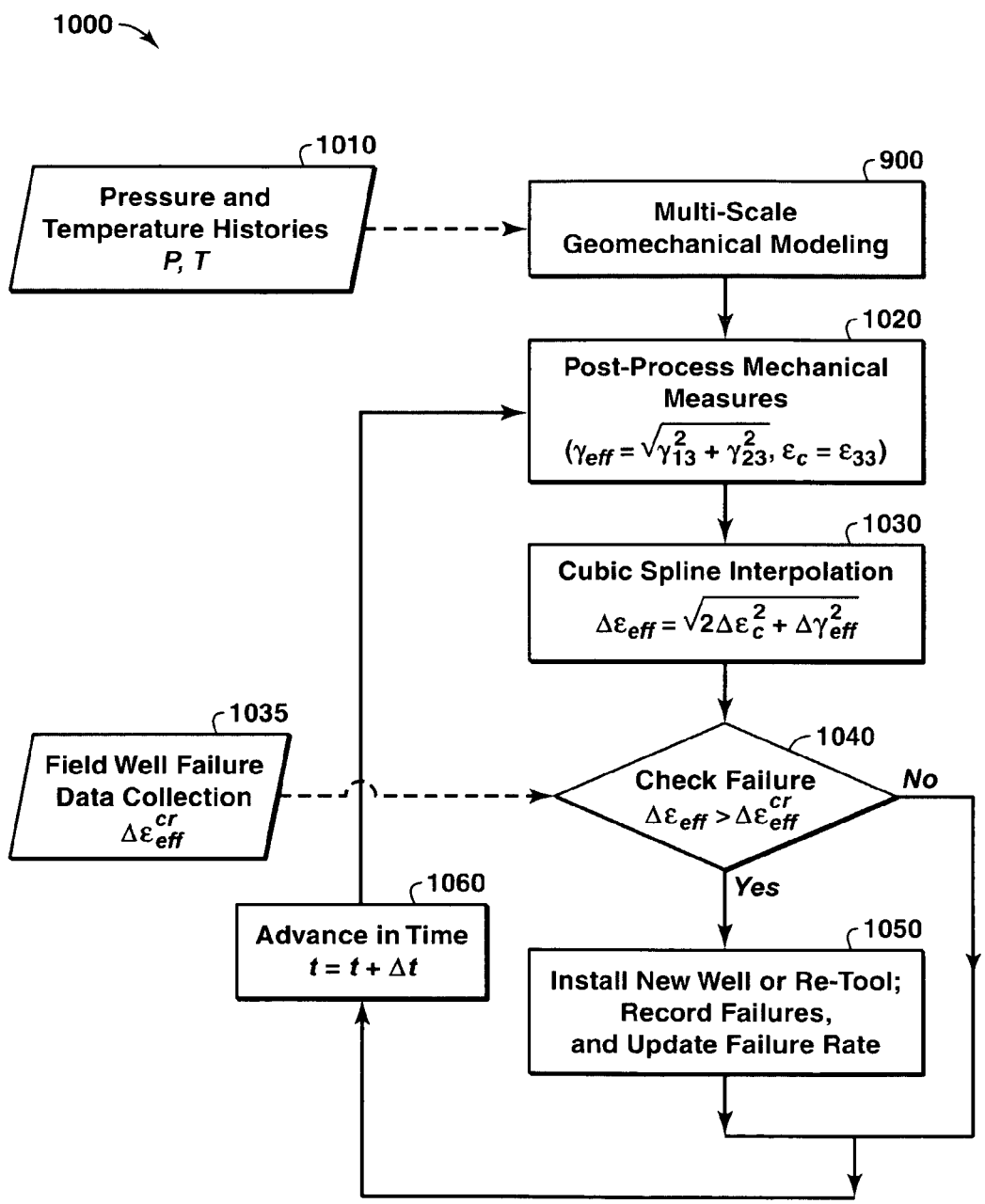
FIG. 10 is a flow diagram illustrating a method for predicting well reliability by computer simulation, in one embodiment.

FIG. 10 is a flow diagram illustrating a method 1000 for predicting well reliability by computer simulation, in one embodiment. The purpose is to determine the likelihood of casing or tool failures based upon various field operation scenarios. This, in turn, informs the operator as to "best production practices" to minimize the likelihood of wellbore failures in the future.

As seen in FIG. 10, the method 1000 first involves the assimilation of pore pressure history for a production area or geomechanical system under study. This step is indicated at Box 1010. The step of Box 1010 is consistent with Box 126 of FIG. 4. Historical pore pressure data may be gathered from downhole sensors residing in producing wells. Alternatively, or in addition, pore pressure history may be derived or interpolated using known reservoir analysis techniques. Pore pressure history is preferably acquired from multiple wells within the physical boundaries defining the geomechanical system.

As part of Box 1010, temperature history may also be gathered. In this respect, the mechanical characteristics of some rock formations may be sensitive to temperature. Temperature data may also be obtained from downhole sensors residing in producing wells.

Other reservoir characteristics may also be acquired within the physical boundaries of the geomechanical system. These include porosity and permeability. Porosity and permeability data are typically obtained from well logs and core samples.

Next, using the pore pressure history and, optionally, temperature histories acquired in step 1010, geomechanical modeling takes place. This step is indicated at Box 900 of FIG. 10. Box 900 is representative of the geomechanical modeling method 900 of FIGS. 9A and 9B as described above, in its various embodiments. In this respect, the geomechanical modeling method derives a finite element ("FE")-based model from a map-based geologic model. Preferably, the modeling method 900 provides a multi-scale geomechanical model that includes the capability to build submodels from geological structures with increasing levels of refinement. In either instance, the pore pressure history 1010 obtained from subsurface sensors and reservoir analysis is mapped to geomechanical model nodal points formed from the method 900.

It is understood that for purposes of the predictive method 1000, other geomechanical models may be employed. For example, the model 100 in its various embodiments may be utilized. What is desired is that the model permit the analyst to determine prevailing stresses or shear strains at nodal points within the reservoir, including nodal points at the approximate location of a selected well under study.

As a result of the geomechanical analysis 900 and the submodeling 990, the analyst is able to determine the strength of the formation at various points in the reservoir. This is in the form of shear strains that are observed to be taking place in the reservoir via simulation. This would include any deformations acting upon casings in the wellbore completions. The wellbores may represent either producers or injectors.

With respect to a wellbore under study, it is assumed that the wellbore formed through the reservoir is generally vertical. However, the methods herein are equally applicable to directionally drilled wells. As the wellbore traverses the reservoir, it passes through a series of rock formations. A hydrocarbon reservoir is preferably located within a rock layer or formation under study.

As the production process is carried out in the hydrocarbon reservoir, the pore pressures within the reservoir are changed. In the case where production fluids are removed, the rock formations in the reservoir may no longer be able to support the rock formations making up the overburden. This, in turn, may create shifting in the reservoir formation, including compaction. Alternatively, injection operations in a rock formation may create a significant increase in pore pressure. This, in turn, may create shifting in the formation as a result of upheaval.

A measure of the forces acting on a rock formation is strain. As a result of pore pressure and, perhaps, temperature changes, strains arise in different directions. First, and as noted above, a compaction strain may arise. Compaction strain may be indicated mathematically by $\epsilon_c$, which represents compressive forces acting upon casing in an axial direction. In the current model, compaction strain is measured in the "3-3," or vertical direction, and may be written as $\epsilon_{3\text{-}3}$. In this instance, compaction strain is generally the percentage of shortening of a pipe string in response to compaction. However, it is understood that the current strain calculations do not require that the wellbore be vertical.

In addition, out-of-plane shear strains may arise as a result of production activities. Mathematically, this may be described as strain in the "1-3" direction ($\gamma_{1\text{-}3}$) and strain in the "2-3" direction ($\gamma_{2\text{-}3}$). Each of these directions represents an offset or angle from the vertical direction. Strain in the "1-3" direction ($\gamma_{1\text{-}3}$ preferably defines a shear strain component residing at a location between the vertical plane and a first horizontal axis. Strain in the "2-3" direction ($\gamma_{2\text{-}3}$) defines a shear strain component residing at a location between the vertical plane and a second horizontal axis orthogonal to the first horizontal axis.

Using the modeling method 900 and submodeling step 990, strain values $\gamma_{1\text{-}3}$, $\gamma_{2\text{-}3}$ may be computed at a particular location within a reservoir. The strain values $\gamma_{1\text{-}3}$ and $\gamma_{2\text{-}3}$ can be determined from the geomechanical analysis 990 at any node in three dimensions. The strain values $\gamma_{1\text{-}3}$ and $\gamma_{2\text{-}3}$ are then used to create a cumulative angle referred to herein as a "casing kink angle." The casing kink angle represents combined out-of-plane forces acting against the casing of a well. It should be noted that the strain values $\gamma_{1\text{-}3}$, $\gamma_{2\text{-}3}$ and $\epsilon_c$ are calculated during the solution process using commercial FEA software such as ABAQUS™.

The cumulative casing kink angle may also be referred to as an effective shear strain ($\gamma_{eff}$). This is shown in FIG. 10 at Box 1020. The effective shear strain $\gamma_{eff}$ represents a cumulative strain value, and is mathematically derived from a post-simulation calculation by the following equation:

$$\gamma_{eff} = \sqrt{\gamma_{13}^2 + \gamma_{23}^2}$$

where $\gamma_{eff}$ effective shear strain $\gamma_{13}$ shear strain component residing at a location between a vertical plane and a first horizontal axis $\gamma_{23}$ shear strain component residing at a location between a vertical plane and a second horizontal axis orthogonal to the first horizontal axis A series of geomechanical simulation runs may be made for nodal points at different locations along a given plane or horizon. The purpose is to generate scalar values representing shear strains $\gamma_{1-3}$, $\gamma_{2-3}$ and compaction strains $\epsilon_c$ being imposed upon the casings of various wellbores at a designated depth. These values are then mathematically combined to derive an effective strain value ($\epsilon_{eff}$). This is shown at step 1030 of FIG. 10.

Based on a study of casing plastic shear slip failure, it was found that the compaction strain ($\epsilon_c$) reduces the capability of the casing to withstand shear slip strain, and vice versa. In one aspect, a cubic spline algorithm is used to derive the effective strain value ($\epsilon_{eff}$) combining the compaction strain value ($\epsilon_c$) and the effective shear strain value ($\gamma_{eff}$). The particular cubic spline algorithm shown at step 1030 uses an incremental effective strain value ($\Delta\gamma_{eff}$) and an incremental compaction strain value ($\Delta\epsilon_c$) to derive an incremental compaction strain value ($\Delta\epsilon_{eff}$).

The effective strain increment ($\Delta\epsilon_{eff}$) is represented in the following cubic spline formula:

$$\Delta\epsilon_{eff} = \sqrt{2\Delta\epsilon_c^2 + \Delta\gamma_{eff}^2}.$$

where $\Delta\epsilon_{eff}$ effective strain increment
$\epsilon_c$ compaction strain
$\Delta\epsilon_c$ compaction strain increment
$\gamma_{eff}$ effective shear strain
$\Delta\gamma_{eff}$ effective shear strain increment As noted, the compaction strain value ($\epsilon_c$) and the out-of-plane shear strain values ($\gamma_{1-3}$, $\gamma_{2-3}$) are solved using the geomechanical model 900. More specifically, these values ($\epsilon_c$, $\gamma_{1-3}$, $\gamma_{2-3}$) are solved through the results of the finite element analysis and the geomechanical simulation from step 980. In a more localized nodal basis, the values ($\epsilon_c$, $\gamma_{1-3}$, $\gamma_{2-3}$) are obtained through the results of the submodeling geomechanical simulation from step 990. These values ($\epsilon_c$, $\gamma_{1-3}$, $\gamma_{2-3}$) are then converted into the effective shear strain value ($\gamma_{eff}$) in accordance with step 1020.

The effective shear strain value ($\gamma_{eff}$) and the compaction strain value ($\epsilon_c$) are then converted into an incremental effective shear strain value ($\Delta\gamma_{eff}$) and an incremental compaction strain value ($\Delta\epsilon_c$). Each value ($\Delta\gamma_{eff}$, $\Delta\epsilon_c$) is based upon a difference in value from the well installation date to a selected date, typically a selected date in the future. The cubic spline algorithm 1030 can thus be used to determine incremental effective shear strain ($\Delta\epsilon_{eff}$) at any point on a given plane. Further, the incremental effective shear strain ($\Delta\epsilon_{eff}$) may be estimated at various points in time based upon simulated formation changes.

It is believed that the cubic spline interpolation method described above for calculating the incremental effective shear strain value ($\Delta\gamma_{eff}$) offers the capability to interpolate with a desired degree of accuracy. However, other interpolation formulas may be used. These include, for example, radial basis function (RBF) calculations, Kriging, and Shepherd's method.

Using the selected interpolation technique for calculating the incremental effective strain value ($\Delta\epsilon_{eff}$), a database that contains the mechanical measurements from the submodeling 990 along the given plane may be built. In one aspect, the database represents the incremental effective strain values ($\Delta\epsilon_{eff}$) for the various wellbores along the given plane.

Next, an effective strain criteria ($\epsilon_{eff}^{cr}$) is determined. This is shown in one embodiment at step 1035 of FIG. 10. The effective strain criteria ($\epsilon_{eff}^{cr}$) is designed to serve as a "baseline" for determining when a particular wellbore should be retooled or replaced. The deformation of a well determines the producing life of that well. Therefore, it is helpful to know the history of a well from the installation date to current or failure date to estimate the likelihood of well failure.

In one aspect, the effective strain criteria is based upon a history of well failures experienced in the physical boundaries. The analyst subjectively selects a strain value based upon empirical observations and experiences that represents a threshold. To develop the incremental strain criteria ($\Delta\epsilon_{eff}^{cr}$), field data concerning wells that have already failed is collected. Along with identifying which wells have failed, information concerning the date in time for such failures is accumulated. The frequency of those well failures as a function of well strain is then plotted.

Figure 11:
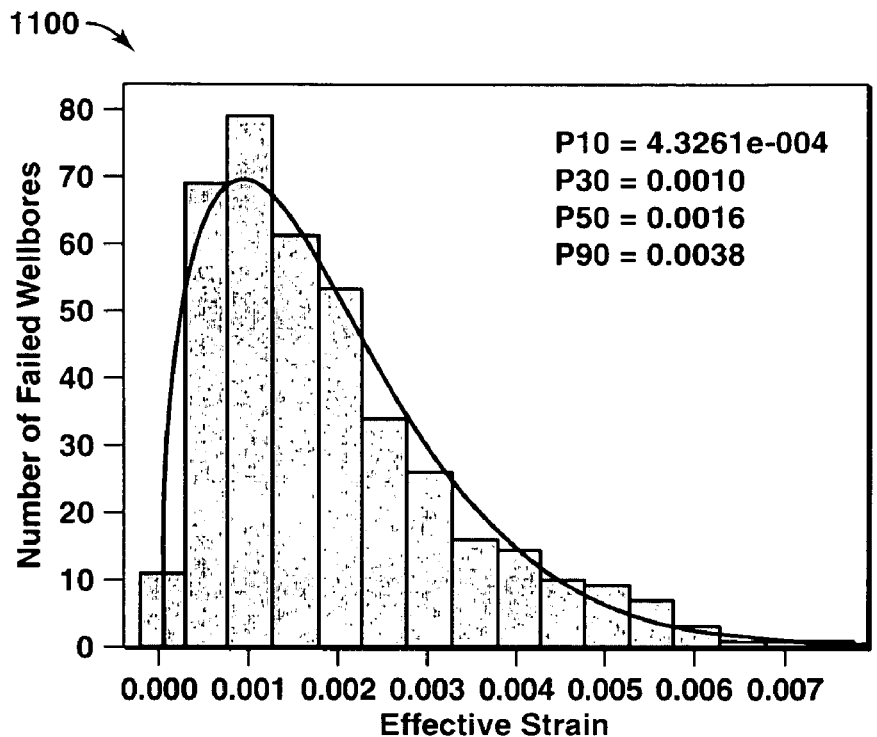
FIG. 11 is a graph comparing frequency of well failure versus effective strain at point of failure.

FIG. 11 is a graph presenting a population of failed wells within a field. The graph compares effective strain $\gamma_{eff}$ suffered by each well at the point of failure, with frequency. In FIG. 11, the "x"-axis represents effective strain ($\gamma_{eff}$), that is, the amount of strain experienced by each well at its point of failure. For the "y"-axis, the effective strain $\gamma_{eff}$ essentially runs from 0 up to 0.007.

The "y"-axis represents well failure frequency, that is, the number of wells that failed at each incremental amount of strain $\Delta\epsilon_{eff}$. The occurrences start at year zero and progress through the production history. The illustrative frequency increments are in units of 10.

As part of FIG. 11, a chart of "P" values is provided. Each "P" value represents a percentage of the well population that failed as a result of subsurface strain. For example, $P_{30}$ indicates that 30% of the wells in the field failed at a corresponding effective strain $\epsilon_{eff}$. In FIG. 11, $P_{30}$ is at or below 0.001.

The following is a more complete list of examples:

$P_{10}$=4.3261e−004, or 0.00043261
$P_{30}$=0.0010
$P_{50}$=0.0016
$P_{90}$=0.0038

The well failure distribution of FIG. 11 is similar to a Weibull distribution. The mode (peak failure) occurs at a 0.001 effective strain increment. This corresponds to the $P_{30}$ of the Weibull distribution. This also becomes the effective strain criteria $\Delta\epsilon_{eff}^{cr}$ of step 1135. Stated another way, 0.001 becomes the selected baseline.

The method 1000 also includes a comparison step. This is shown in one embodiment at step 1040 of FIG. 10. The comparison step 1040 involves comparing (1) the effective strain ($\epsilon_{eff}$) at a selected nodal point representing the approximate location of a well at a given depth within the physical boundaries, with (2) the effective strain criteria ($\epsilon_{eff}^{cr}$). The purpose is to determine if the effective strain ($\epsilon_{eff}$) exceeds the effective strain criteria ($\epsilon_{eff}^{cr}$).

In the particular embodiment of step 1040 of FIG. 10, the comparison is made between an incremental effective strain value ($\Delta\epsilon_{eff}$) for a wellbore and the incremental effective strain criteria ($\Delta\epsilon_{eff}^{cr}$) In FIG. 10, the effective strain criteria ($\epsilon_{eff}^{cr}$) is an incremental strain criteria ($\Delta\epsilon_{eff}^{cr}$). The incremental factor is used due to the fact that not all the wells are installed at the beginning of production. Wells drilled at later dates do not inherit prior deformation history. Because the individual wells might experience different deformation histories, it is preferred to utilize an incremental effective strain criteria.

The comparison step 1040 serves as a "failure check." The failure check is conducted to determine whether the effective strain increment $\Delta\epsilon_{\mathit{eff}}$ of a well at a particular point in time and under a designated simulation 900 exceeds the effective strain criteria $\Delta\epsilon_{\mathit{eff}}^{cr}$. The failure check is conducted by asking whether an effective strain increment is greater than a designated strain failure criteria. This step may be represented mathematically as:

$$\Delta\epsilon_{\mathit{eff}} > \Delta\epsilon_{\mathit{eff}}^{cr}$$

where $\Delta\epsilon_{\mathit{eff}}$ effective strain increment
$\Delta\epsilon_{\mathit{eff}}^{cr}$ effective strain increment criteria When the effective strain increment ($\Delta\epsilon_{\mathit{eff}}$) of a well exceeds the "P"-value based failure criteria ($\Delta\epsilon_{\mathit{eff}}^{cr}$), the well is likely to fail. The operator may then re-tool the well. Alternatively, the operator may plug and abandon the well, and install a new well. The operator should also record the failure and update the failure rate records for FIG. 11. This process is shown in FIG. 10 at step 1050.

It is preferred that the evaluation of FIG. 10 be conducted for all the wells in the field. The annual failure rates should be recorded.

If the effective strain component ($\Delta\epsilon_{\mathit{eff}}$) at a selected nodal point does not exceed the effective strain criteria ($\Delta\epsilon_{\mathit{eff}}^{cr}$), then the operator calendars to recheck the strength of the formation at the selected nodal point at a later time. This is shown at step 1060. The recheck step may be demonstrated by the formula:

$$t_r = t_c + \Delta t$$

where $t_c$ time at which the strength of the formation is checked;
$\Delta t$ increment of time in which the strength of the formation will be rechecked; and
$t_r$ time for rechecking the strength of the formation.

The increment of time ($\Delta t$) in which the strength of the formation is rechecked may be any length of time such as, for example, six months to two years.

It should be added that the effective strain criteria ($\Delta\epsilon_{\mathit{eff}}^{cr}$) may be based on criteria other than or in addition to actual history of well failures. For example, the analyst may estimate an effective strain criteria ($\Delta\epsilon_{\mathit{eff}}^{cr}$) based on general experiences in other fields. The analyst may alternatively choose to take into account differences in well construction as between different wells. In this respect, wells in certain portions of a field may have a different construction than wells in another area.

Figure 12:
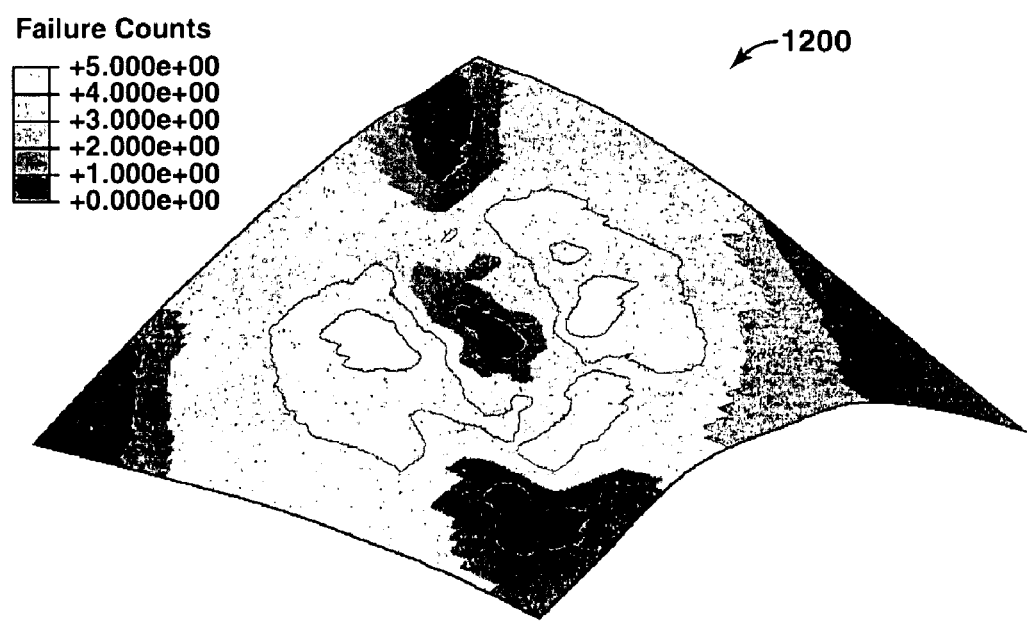
FIG. 12 is a formation contour map of a field. Areas where well failures have occurred are shown in the lighter-colored regions of the map.

Using the method 1000, a plot may be made showing the location of anticipated well failures within a field. FIG. 12 presents a contour plot of a field 1200 mapped over a selected formation level or layer. The contour plot in FIG. 12 illustrates well failure counts when all the nodal points are installed. The failure counts begin with each well in the field 1200, and carry forward through a thirty year production span.

It was learned from this particular simulation that most well failures are anticipated to occur in or near the center of the field. The lighter-shaded regions in FIG. 12 represent field areas with more than four replacements (well failures) during 30 years of anticipated production. This is consistent with actual well failure experiences in that particular field. Production activities in this field had resulted in a "subsidence bowl," causing well failures in the internal areas of the field 1200.

The benefit of the simulation of FIG. 12 is that it informs the operator as to pressure management strategies to avoid the simulated casing failures. For example, the operator may choose to place one or more injection wells in or near the center of the field 1200 to minimize subsidence. Alternatively, or in addition, producers may be spaced farther apart in the anticipated sensitive areas, thereby preserving "pillars" for overburden support.

FIG. 12 also demonstrates that the present disclosure offers a computer-implemented method for predicting wellbore failures in a geomechanical system. The geomechanical system has a subsurface rock formation containing a hydrocarbon reservoir. In one aspect, the method includes defining physical boundaries for the geomechanical system, and acquiring pore pressure history from production activities of multiple wells existing within the physical boundaries.

The method also includes running a geomechanical simulation for the geomechanical system to simulate the effects of changes in a selected reservoir characteristic on stress in rock formations within the physical boundaries. The purpose is to determine the strength of the rock formations at selected nodes in the reservoir. Preferably, the at least one reservoir characteristic comprises pore pressure history, temperature history, permeability, porosity, or combinations thereof. The strength of the formations may be represented by an effective strain ($\epsilon_{\mathit{eff}}$) that takes into account a compaction strain ($\epsilon_c$) and out-of-plane shear strains ($\gamma_{1-3}$, $\gamma_{2-3}$).

The method also includes determining an effective strain criteria ($\epsilon_{\mathit{eff}}^{cr}$). Preferably, the effective strain criteria ($\epsilon_{\mathit{eff}}^{cr}$) is based at least in part on a history of well failures experienced in the physical boundaries. A comparison is then made. The comparison step is performed by comparing (1) the effective strain ($\epsilon_{\mathit{eff}}$) at a selected nodal point representing the approximate location of wells at a given depth within the physical boundaries, with (2) the effective strain criteria ($\epsilon_{\mathit{eff}}^{cr}$) to determine if the effective strain ($\epsilon_{\mathit{eff}}$) exceeds the effective strain criteria ($\epsilon_{\mathit{eff}}^{cr}$). The analyst then determines which wells within the physical boundaries have an effective strain ($\epsilon_{\mathit{eff}}$) that exceeds the effective strain criteria ($\epsilon_{\mathit{eff}}^{cr}$) at the given depth, thereby predicting wellbore failures.

In one embodiment, the method also includes creating a map of the physical boundaries for the geomechanical system demonstrating the approximate location of the wellbore failures.

In one embodiment, the method includes additional steps prior to running the geomechanical simulation. These include acquiring mechanical properties of rock formations within the physical boundaries, and automatically creating a finite element mesh representing the geomechanical system. Here, the mesh defines a plurality of nodes representing points in space, with each point having potential displacement in more than one direction. The mesh preferably provides a positive value for any rock formations having a zero thickness as derived from subsurface data. In this way, a positive volume is created for each rock formation.

The method may also include mapping pore pressure within the geomechanical system at a first time for nodes within the mesh, and mapping pore pressure within the geomechanical system at a plurality of additional times to correspond to the nodes within the mesh. In this manner a pore pressure history is mapped and interpolations may be conducted.

Figure 13:
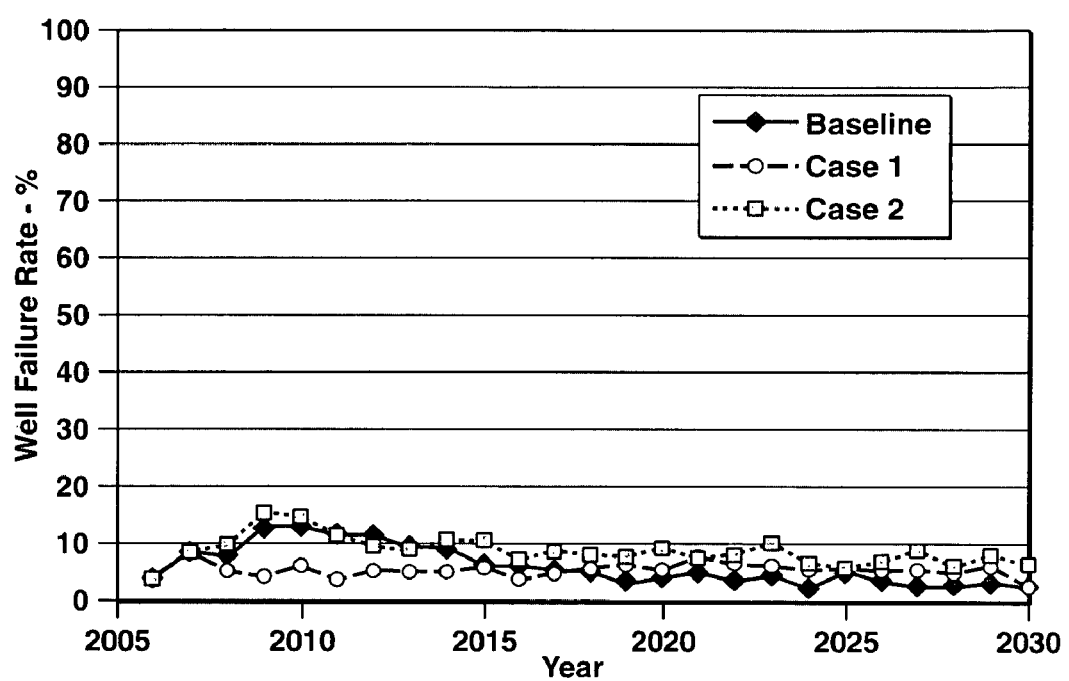
FIG. 13 is a graph charting well failure rates for a field by year. The chart demonstrates well failure sensitivity in a production area by comparing various reservoir management scenarios.

The method 1000 may also be used to guide reservoir pressure management by conducting sensitivity studies. FIG. 13 is a graph 1300 simulating well failure rates for a field by year. The chart 1300 begins in the year 2006. The chart 1300 demonstrates well failure sensitivity in a production area.

Three lines are provided in FIG. 13. Line 1310 provides a baseline. The term "baseline" refers to an anticipated failure rate using a reservoir management scenario. Line 1320 demonstrates a relaxed state, and is generically denoted as "Case 1." The term "relaxed state" refers to a lack of pressure support inside of the reservoir. Line 1330 is a hybrid, and is generically denoted as "Case 2." The term "hybrid" refers to the addition of pressure support inside of the reservoir. This would come from, for example, a steam drive or water flood arrangement. It is noted that the pressure support indicated in this hybrid Case 2 may or may not be physically feasible or practical for the specific reservoir. Numerical simulation models are not necessarily subject to field constraints.

The purpose of the chart 1300 is to predict the annual failure rate of wells in a field and to reduce the number of well failures. This study helps to identify the sensitivity of pressure support and temperature sensitivity on annual failure rate prediction. In the example of FIG. 13, Case 1 offers the better scenario for limiting well failures over the life of the field as compared to Case 2.

As can be seen, an improved method for geomechanical modeling is offered herein. The method employs multi-scale geomechanical computer simulations of earth stress changes associated with the hydrocarbon recovery process. In various embodiments, the method allows an analyst to map pressure, temperature, fluid flow, displacement or stress boundary conditions from a map-based discretized simulation domain to a three-dimensional, finite-element-based discretized simulation domain. The methods herein may have particular application in translating production-related field measurements into appropriate solution constraints.

In addition, an improved method of predicting wellbore failure is provided. The method is helpful in the area of analysis and forecasting capabilities to mitigate well casing failures associated with hydrocarbon recovery. It also is helpful with analysis and forecasting capabilities for use with model predictive tools to manage reservoir pressure.

While it will be apparent that the invention herein described is well calculated to achieve the benefits and advantages set forth above, it will be appreciated that the invention is susceptible to modification, variation and change without departing from the spirit thereof.

What is claimed is:

1. A computer-implemented method for predicting well reliability in a three-dimensional geomechanical system, comprising:
defining physical boundaries for the geomechanical system, wherein the geomechanical system comprises a hydrocarbon reservoir and a wellbore casing;
acquiring history for at least one reservoir characteristic from multiple wells within the physical boundaries, wherein the at least one reservoir characteristic comprises pore pressure history;
acquiring mechanical properties of rock formations and wellbore casing within the physical boundaries;
creating a finite element mesh representing the geomechanical system, the mesh defining a plurality of nodes representing points in space, each point having potential displacement in more than one direction;
mapping pore pressure within the geomechanical system at a first time for nodes within the mesh;
mapping pore pressure within the geomechanical system at a plurality of additional times to correspond to the nodes within the mesh, wherein the mesh provides a positive value for any rock formations having a zero thickness as derived from subsurface data in order to create volume for each rock formation;
running a geomechanical simulation for the geomechanical system to simulate the effects of changes in the at least one reservoir characteristic on stress in rock formations and wellbore casing within the physical boundaries to determine an effective strain ($\epsilon_{eff}$) in a member of the geomechanical system at selected nodes in the geomechanical system, by considering a compaction strain ($\epsilon_c$) and at least two out-of-plane shear strains ($\gamma_{1-3}$, $\gamma_{2-3}$);
determining a critical effective strain criteria ($\epsilon_{eff}^{cr}$) for a member of the geomechanical system from the compaction strain ($\epsilon_c$) and out of plane shear strains ($\gamma_{1-3}$, $\gamma_{2-3}$)
comparing (1) the effective strain ($\epsilon_{eff}$) at a selected nodal point representing the approximate location of a well at a given depth within the physical boundaries, with (2) the critical effective strain criteria ($\epsilon_{eff}^{cr}$) to determine if the effective strain ($\epsilon_{eff}$) exceeds the critical effective strain criteria ($\epsilon_{eff}^{cr}$).

2. The method of claim 1, wherein the finite-element-based model provides submodels having increasing levels of refinement to determine compaction strain ($\epsilon_c$) and out-of-plane shear strains ($\gamma_{1-3}$, $\gamma_{2-3}$) at the selected nodes in the reservoir.

3. The method of claim 1, wherein changes in pore pressure within the geomechanical system are designed to simulate a decrease in pore pressure in connection with a production of hydrocarbons from the hydrocarbon reservoir.

4. The method of claim 1, wherein the effective strain criteria ($\epsilon_{eff}^{cr}$) is based at least in part upon a history of well failures experienced in the physical boundaries.

5. The method of claim 2, wherein the out-of-plane shear forces ($\gamma_{1-3}$, $\gamma_{2-3}$) are combined into an effective shear strain ($\gamma_{eff}$) using a cubic spline calculation as follows:

$$\gamma_{eff} = \sqrt{\gamma_{13}^2 + \gamma_{23}^2}$$

where
$\gamma_{13}$ shear strain component residing at a location between a vertical plane and a first horizontal axis; and
$\gamma_{23}$ shear strain component residing at a location between a vertical plane and a second horizontal axis orthogonal to the first horizontal axis.

6. The method of claim 5, wherein:
the effective shear strain ($\gamma_{eff}$) is an effective shear strain increment ($\Delta\gamma_{eff}$) calculated by computing a differential between the effective shear strain at a nodal point proximate a selected well at the time the selected well was completed, and the effective shear strain at that nodal point at a specified later point in time;
the compaction strain ($\epsilon_c$) is a compaction strain increment ($\Delta\epsilon_c$) calculated by computing a differential between the compaction strain at the nodal point proximate the selected well at the time the selected well was completed, and the compaction strain at that nodal point at the specified later point in time; and
the effective strain is an effective strain increment ($\Delta\epsilon_{eff}$) calculated using an interpolative method.

7. The method of claim 6, wherein the interpolative method is a cubic spline calculation as follows:

$$\Delta\epsilon_{eff} = \sqrt{2\Delta\epsilon_c^2 + \Delta\gamma_{eff}^2}.$$

8. The method of claim 7, wherein:
the effective strain criteria ($\epsilon_{eff}^{cr}$) is an effective strain criteria increment ($\Delta\epsilon_{eff}^{cr}$), determined by first comparing (1) the effective strain increment ($\Delta\epsilon_{eff}$) at which a plurality of wells in a field have actually failed, with (2) the number of instances in which the wells failed at the various effective strain increments ($\Delta\epsilon_{eff}$), and then electing a baseline for the effective strain increment ($\Delta\epsilon_{eff}$) to serve as the effective strain criteria increment ($\Delta\epsilon_{eff}^{cr}$).

9. The method of claim 4, further comprising:
if the effective strain ($\epsilon_{eff}$) at the selected nodal point meets or exceeds the effective strain criteria ($\epsilon_{eff}^{cr}$), making a decision to (i) retool the well, (ii) plug the well, or (iii) plug the well and install a new well; and
if the effective strain ($\epsilon_{eff}$) at the selected nodal point does not exceed the effective strain criteria ($\epsilon_{eff}^{cr}$), rechecking the strength of the formation at the selected nodal point at a later time.

10. The method of claim 1, wherein the geomechanical simulation derives a finite element based model from a map-based geologic model.

11. The method of claim 1, further comprising:
acquiring temperature history within the physical boundaries.

12. The method of claim 1, wherein prior to running a geomechanical simulation, the method further comprises:
acquiring subsurface data for the rock formations comprising well logging data, seismic data, or combinations thereof;
entering the physical boundaries for the geomechanical system and the subsurface data for the rock formations within the physical boundaries into a pre-processor program to create a three-dimensional grid in a map-based computer model, wherein the three-dimensional grid is automatically compiled from the subsurface data, and wherein the three-dimensional grid defines nodes in a geological structure that are converted into the nodes of the finite element mesh as a result of creating the finite element mesh.

13. The method of claim 12, wherein automatically creating a finite element mesh is performed by running a utility program that is compatible with a geomechanical solver program.

14. The method of claim 13, wherein running a geomechanical simulation for the geomechanical system is performed by running the geomechanical solver program to solve for earth stress changes.

15. The method of claim 12 wherein the three-dimensional grid is automatically compiled from well logging data into a three-dimensional digital representation using an ASCII data-to-ZMap programming function.

16. The method of claim 12, wherein the pre-processor program automatically accounts for and repairs any singular geologic entities in the rock formations such as pinchouts and erosional features.

17. A computer-implemented method for modeling a geomechanical system, the geomechanical system having a subsurface rock formation containing a hydrocarbon reservoir, comprising:
defining physical boundaries for the geomechanical system, wherein the geomechanical system comprises a hydrocarbon reservoir and a wellbore casing as members of the geomechanical system;
creating a map-based geologic model from well logging data and seismic data, the map-based geologic model defining a three-dimensional, digital representation of the geomechanical system;
deriving a finite element-based global geomechanical model from the map-based geologic model;
deriving a complimentary finite element-based submodel from the global geomechanical model to simulate the effects of changes in pore pressure on stress in the rock formation and wellbore casing to determine the an effective strain ($\epsilon_{eff}$) in a member of the geomechanical system at selected nodes in the geomechanical system that takes into account a compaction strain ($\epsilon_c$) and at least two out-of-plane shear strains ($\gamma_{1-3}$, $\gamma_{2-3}$);
determining a critical effective strain criteria ($\epsilon_{eff}^{cr}$) for a member of the geomechanical system based upon analysis of a history of well failures experienced in the geomechanical system and using a probabilistic method based upon a measure of casing kink angle or dogleg severity;
comparing (1) the effective strain ($\epsilon_{eff}$) at the selected node, with (2) the critical effective strain criteria ($\epsilon_{eff}^{cr}$) to determine if the effective strain ($\epsilon_{eff}$) exceeds the critical effective strain criteria ($\epsilon_{eff}^{cr}$).

18. The method of claim 17, wherein creating a map-based geologic model automatically accounts for and repairs singular geologic entities such as pinchouts and erosional features.

19. The method of claim 17, wherein creating a map-based geologic model comprises automatically stacking two or more rock layers within physical boundaries of the geomechanical system without having to manually stack the well logging data and the seismic data.

20. The method of claim 19, further comprising:
integrating rock material properties into the finite element-based global geomechanical model; and
initializing a geostatic condition of the finite element-based geomechanical model before deriving the complimentary finite element-based submodel.

21. The method of claim 20, wherein initializing a geostatic condition of the finite element-based geomechanical model comprises reviewing well logging data, reviewing drilling records, reviewing completion test records, reviewing records of sand production from the wells within the physical boundaries of the geomechanical model, or combinations thereof.

22. The method of claim 21, wherein initializing a geostatic condition of the finite element-based geomechanical model further comprises reviewing a history of casing failures from the wells within the physical boundaries of the geomechanical model.

23. The method of claim 17, wherein changes in pore pressure within the rock formation is designed to simulate a decrease in pore pressure in connection with a production of hydrocarbons from the hydrocarbon reservoir.

24. The method of claim 23, wherein the out-of-plane shear forces ($\gamma_{1-3}$, $\gamma_{2-3}$) are combined into an effective shear strain ($\gamma_{eff}$) using a cubic spline calculation as follows:

$$\gamma_{eff} = \sqrt{\gamma_{13}^2 + \gamma_{23}^2}$$

where
$\gamma_{13}$ shear strain component residing at a location between a vertical plane and a first horizontal axis; and
$\gamma_{23}$ shear strain component residing at a location between a vertical plane and a second horizontal axis orthogonal to the first horizontal axis.

25. The method of claim 24, wherein:
the effective shear strain ($\gamma_{eff}$) is an effective shear strain increment ($\Delta\gamma_{eff}$) calculated by computing a differential between the effective shear strain at a nodal point proximate a selected well at the time the selected well was completed, and the effective shear strain at that nodal point at a specified later point in time;
the compaction strain ($\epsilon_c$) is a compaction strain increment ($\Delta\epsilon_{eff}$) calculated by computing a differential between the compaction strain at the nodal point proximate the selected well at the time the selected well was completed, and the compaction strain at that nodal point at the specified later point in time; and the effective strain is an effective strain increment ($\Delta\epsilon_{eff}$) calculated using a cubic spline calculation as follows:

$$\Delta\epsilon_{eff}=\sqrt{2\Delta\epsilon_c^2+\Delta\gamma_{eff}^2}.$$

26. The method of claim 25, wherein:
the effective strain criteria ($\epsilon_{eff}^{cr}$) is an effective strain criteria increment ($\Delta\epsilon_{eff}^{cr}$), determined by first comparing (1) the effective strain increment ($\Delta\epsilon_{eff}$) at which a plurality of wells in a field have actually failed, with (2) the frequency at which the wells failed at the various effective strain increments ($\Delta\epsilon_{eff}$), and then electing a baseline for the effective strain increment ($\Delta\epsilon_{eff}$) to serve as the effective strain criteria increment ($\Delta\epsilon_{eff}^{cr}$).

27. The method of claim 17, further comprising:
if the effective strain ($\epsilon_{eff}$) at the selected nodal point meets or exceeds the effective strain criteria ($\epsilon_{eff}^{cr}$), making a decision to (i) retool the well, (ii) plug the well, or (iii) plug the well and install a new well; and
if the effective strain ($\epsilon_{eff}$) at the selected nodal point does not exceed the effective strain criteria ($\epsilon_{eff}^{cr}$), rechecking the strength of the formation at the selected nodal point at a later time.

28. A computer-implemented method for predicting wellbore failure in a geomechanical system, the geomechanical system having a subsurface rock formation containing a hydrocarbon reservoir, comprising:
defining physical boundaries for the geomechanical system, wherein the geomechanical system comprises a hydrocarbon reservoir and a wellbore casing;
acquiring pore pressure history from production activities of multiple wells existing within the physical boundaries;
acquiring mechanical properties of rock formations and wellbore casing within the physical boundaries;
creating a finite element mesh representing the geomechanical system, the mesh defining a plurality of nodes representing points in space, each point having potential displacement in more than one direction, wherein the mesh provides a positive value for any rock formations having a zero thickness as derived from subsurface data in order to create volume for each rock formation;
mapping pore pressure within the geomechanical system at a first time for nodes within the mesh;
mapping pore pressure within the geomechanical system at a plurality of additional times to correspond to the nodes within the mesh, wherein the mesh provides a positive value for any rock formations having a zero thickness as derived from subsurface data in order to create volume for each rock formation;
running a geomechanical simulation for the geomechanical system to simulate the effects of changes in the at least one reservoir characteristic on stress in rock formations and wellbore casing within the physical boundaries to determine an effective strain ($\epsilon_{eff}$) in a member of the geomechanical system at selected nodes in the reservoir, by considering a compaction strain ($\epsilon_c$) and at least two out-of-plane shear strains ($\gamma_{1-3}$, $\gamma_{2-3}$);
determining a critical effective strain criteria ($\epsilon_{eff}^{cr}$) for a member of the geomechanical system from the compaction strain ($\epsilon_c$) and out of plane shear strain ($\gamma_{1-3}$, $\gamma_{2-3}$) using a probabilistic method based upon a measure of casing kink angle or dogleg severity;
comparing (1) the effective strain ($\epsilon_{eff}$) at a selected nodal point representing the approximate location of a well at a given depth within the physical boundaries, with (2) the critical effective strain criteria ($\epsilon_{eff}^{cr}$) to determine if the effective strain ($\epsilon_{eff}$) exceeds the critical effective strain criteria ($\epsilon_{eff}^{cr}$); and
determining which wells within the physical boundaries have an effective strain ($\epsilon_{eff}$) that exceeds the effective strain criteria ($\epsilon_{eff}^{cr}$) at the given depth, thereby predicting wellbore failures; and
creating a map of the physical boundaries for the geomechanical system demonstrating the approximate location of the wellbore failures.

29. The method of claim 28, wherein the at least one reservoir characteristic comprises pore pressure history, temperature history, permeability, porosity, or combinations thereof.

30. The method of claim 29, wherein the geomechanical simulation provides submodels having increasing levels of refinement to determine compaction strain ($\epsilon_c$) and out-of-plane shear strains ($\gamma_{1-3}$, $\gamma_{2-3}$) at the approximate locations of the wells and at the selected depth.

31. The method of claim 29, wherein changes in pore pressure within the geomechanical system are designed to simulate a decrease in pore pressure in connection with a production of hydrocarbons from the hydrocarbon reservoir.

32. The method of claim 29, wherein the effective strain criteria ($\epsilon_{eff}^{cr}$) is based at least in part upon a history of well failures experienced in the physical boundaries.

33. The method of claim 30, wherein the out-of-plane shear forces ($\gamma_{1-3}$, $\gamma_{2-3}$) are combined into an effective shear strain ($\gamma_{eff}$) using a cubic spline calculation as follows:

$$\gamma_{eff}=\sqrt{\gamma_{13}^2+\gamma_{23}^2}$$

where
$\gamma_{13}$ shear strain component residing at a location between a vertical plane and a first horizontal axis; and
$\gamma_{23}$ shear strain component residing at a location between a vertical plane and a second horizontal axis orthogonal to the first horizontal axis.

34. The method of claim 33, wherein:
the effective shear strain ($\gamma_{eff}$) is an effective shear strain increment ($\Delta\gamma_{eff}$) calculated by computing a differential between the effective shear strain at a nodal point proximate each well at the time the well was completed, and the effective shear strain at that nodal point at a specified later point in time;
the compaction strain ($\epsilon_c$) is a compaction strain increment ($\Delta\epsilon_c$) calculated by computing a differential between the compaction strain at the nodal point proximate each well at the time the well was completed, and the compaction strain at that nodal point at the specified later point in time; and
the effective strain is an effective strain increment ($\Delta\epsilon_{eff}$) calculated using an interpolative method.

35. The method of claim 34, wherein the interpolative method is a cubic spline calculation as follows:

$$\Delta\epsilon_{eff}=\sqrt{2\Delta\epsilon_c^2+\Delta\gamma_{eff}^2}.$$

36. The method of claim 35, wherein:
the effective strain criteria ($\epsilon_{eff}^{cr}$) is an effective strain criteria increment ($\Delta\epsilon_{eff}^{cr}$), determined by first comparing (1) the effective strain increment ($\Delta\epsilon_{eff}$) at which a plurality of wells within the physical boundaries have actually failed, with (2) the number of instances in which the wells failed at the various effective strain increments ($\Delta\epsilon_{eff}$), and then electing a baseline for the effective strain increment ($\Delta\epsilon_{eff}$) to serve as the effective strain criteria increment ($\Delta\epsilon_{eff}^{cr}$).

37. The method of claim 36, further comprising:
adjusting reservoir management processes to reduce the predicted number of wellbore failures.

38. The method of claim 37, wherein adjusting reservoir management processes comprises adding one or more injectors to an area of the geomechanical system where wellbore failures are predicted to occur, spacing apart the location of future producers in the area of the geomechanical system where wellbore failures are predicted to occur, or both.

39. The method of claim 30, wherein the geomechanical simulation derives a finite element based model from a map-based geologic model.

40. The method of claim 30, wherein prior to running a geomechanical simulation, the method further comprises:
acquiring subsurface data for the rock formations comprising well logging data, seismic data, or combinations thereof;
the physical boundaries for the geomechanical system and the subsurface data for the rock formations within the physical boundaries are entered into a pre-processor program to create a three-dimensional grid in a map-based computer model, wherein the three-dimensional grid is automatically compiled from the subsurface data, and wherein the three-dimensional grid defines nodes in a geological structure that are converted into the nodes of the finite element mesh as a result of creating the finite element mesh.

41. The method of claim 40, wherein automatically creating a finite element mesh is performed by running a utility program that is compatible with a geomechanical solver program.

42. The method of claim 41, wherein running a geomechanical simulation for the geomechanical system is performed by running the geomechanical solver program to solve for earth stress changes.

43. The method of claim 40, wherein the three-dimensional grid is automatically compiled from well logging data into a three-dimensional digital representation using an ASCII data-to-ZMap programming function.

44. The method of claim 40, wherein the pre-processor program automatically accounts for and repairs any singular geologic entities in the rock formations such as pinchouts and erosional features.

45. A computer-implemented method for predicting wellbore failure in a geomechanical system comprising a hydrocarbon reservoir, the geomechanical system having a subsurface rock formation containing a hydrocarbon reservoir, comprising:
selecting a strain criteria at which wellbores in the geomechanical system are predicted to fail based upon a history of wellbore failures experienced in the hydrocarbon reservoir;
acquiring mechanical properties of rock formations and a wellbore casing within physical boundaries for the geomechanical system;
creating a finite element mesh representing the geomechanical system, the mesh defining a plurality of nodes representing points in space, each point having potential displacement in more than one direction; wherein the mesh provides a positive value for any rock formations having a zero thickness as derived from subsurface data in order to create volume for each rock formation;
mapping pore pressure within the geomechanical system at a first time for nodes within the mesh;
mapping pore pressure within the geomechanical system at a plurality of additional times to correspond to the nodes within the mesh;
running a geomechanical simulation to simulate the effects of changes in a selected reservoir characteristic on stress in rock formations within the hydrocarbon reservoir at a selected time and a selected wellbore area to generate a simulated wellbore strain; wherein generating the simulated wellbore strain comprises determining an effective strain ($\epsilon_{\mathit{eff}}$) in a member of the geomechanical system at selected nodes in the reservoir, considering a compaction strain ($\epsilon_c$) and at least two out of plane shear strains ($\gamma_{1-3}$, $\gamma_{2-3}$), based upon a measure of casing kink angle or wellbore dogleg severity, and the selected reservoir characteristic comprises at least one of pore pressure history, temperature history, permeability, porosity, and combinations thereof;
comparing the simulated wellbore strain with the strain criteria to determine if the simulated wellbore strain exceeds the strain criteria, thereby predicting wellbore failure; and
adjusting hydrocarbon reservoir management processes to militate against the predicted wellbore failure.

46. The method of claim 45, wherein adjusting hydrocarbon reservoir management processes comprises adding one or more injectors to an area of the geomechanical system where wellbore failures are predicted to occur, spacing apart the location of future producers in the area of the geomechanical system where wellbore failures are predicted to occur, or both.

47. The method of claim 45, wherein the finite-element-based model provides submodels having increasing levels of refinement to determine compaction strain ($\epsilon_c$) and out-of-plane shear strains ($\gamma_{1-3}$, $\gamma_{2-3}$) at selected nodes in the reservoir.

48. The method of claim 45, wherein the effective strain is based at least in part upon a history of well failures experienced in the physical boundaries.

* * * * *